United States Patent
Byrd et al.

(10) Patent No.: US 7,915,371 B2
(45) Date of Patent: *Mar. 29, 2011

(54) METHOD AND COMPOSITION FOR SEALING COMPONENTS AND COMPONENTS SEALED THEREBY

(75) Inventors: Norman R. Byrd, Villa Park, CA (US); Steven G. Keener, Trabuco Canyon, CA (US)

(73) Assignee: The Boeing Company, Chicago, IL (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/697,846

(22) Filed: Apr. 9, 2007

(65) Prior Publication Data

US 2007/0181747 A1    Aug. 9, 2007

Related U.S. Application Data

(60) Division of application No. 10/741,359, filed on Dec. 19, 2003, now Pat. No. 7,202,321, which is a continuation-in-part of application No. 10/455,070, filed on Jun. 5, 2003, now Pat. No. 6,809,169, which is a continuation-in-part of application No. 10/436,015, filed on May 12, 2003, now Pat. No. 6,797,795, which is a continuation-in-part of application No. 10/164,826, filed on Jun. 7, 2002, now abandoned.

(51) Int. Cl.
   *C08G 77/26* (2006.01)
(52) U.S. Cl. ............. 528/26; 528/28; 428/447; 427/387
(58) Field of Classification Search ........ 528/26, 528/28; 428/447; 427/387
   See application file for complete search history.

(56) References Cited

U.S. PATENT DOCUMENTS

| | | | |
|---|---|---|---|
| 4,275,184 A | 6/1981 | Bargain et al. | |
| 4,290,810 A | 9/1981 | Montgomery | |
| 4,439,337 A | 3/1984 | Nimerick et al. | |
| 5,100,992 A | 3/1992 | Cohn et al. | |
| 5,187,015 A | 2/1993 | Yorkgitis et al. | |
| 5,296,144 A | 3/1994 | Sternina et al. | |
| 5,328,768 A | 7/1994 | Goodwin | |
| 5,413,865 A | 5/1995 | Nakamura et al. | |
| 5,688,864 A | 11/1997 | Goodwin | |
| 5,844,053 A * | 12/1998 | Nishida | 525/476 |
| 5,980,990 A | 11/1999 | Goodwin | |
| 6,008,410 A | 12/1999 | Olli | |
| 6,191,248 B1 | 2/2001 | Rawlings et al. | |
| 6,245,387 B1 | 6/2001 | Hayden | |
| 6,353,135 B1 | 3/2002 | Olli | |
| 6,355,759 B1 * | 3/2002 | Sherman et al. | 528/28 |
| 6,379,751 B1 | 4/2002 | Schafer et al. | |
| 6,384,171 B1 | 5/2002 | Yamazaki et al. | |
| 6,461,537 B1 | 10/2002 | Turcotte et al. | |
| 6,797,795 B2 | 9/2004 | Byrd | |
| 6,809,169 B2 | 10/2004 | Byrd et al. | |

FOREIGN PATENT DOCUMENTS

| | | |
|---|---|---|
| JP | 1-168718 | 7/1989 |
| WO | WO 96/34029 | 10/1996 |

OTHER PUBLICATIONS

English language translation JP 1-168718, Jul. 4, 1989.*
Hozumi et al., "Preparation of transparent water-repellent films by radio-frequency plasma-enhanced chemical vapour deposition", *Sci.* 32 (1997), pp. 4253-4259.
Hong et al., "Endurable Water-Repellent Glass for Automobiles", *Thin Film Solids* 351, (1999), pp. 274-278.

* cited by examiner

*Primary Examiner* — Margaret G Moore
(74) *Attorney, Agent, or Firm* — Alston & Bird LLP

(57) ABSTRACT

The present invention is directed to a method for applying to a substrate, in the form of a seal, a polysiloxane-containing coating, preferably a polysiloxane(amide-ureide) coating capable of inhibiting corrosion as well as the accumulation of ice. One embodiment of the present invention is directed to a polysiloxane(amide-ureide) that forms a durable, long lasting, anti-corrosive and anti-ice coating when applied to a substrate as a seal.

26 Claims, 7 Drawing Sheets

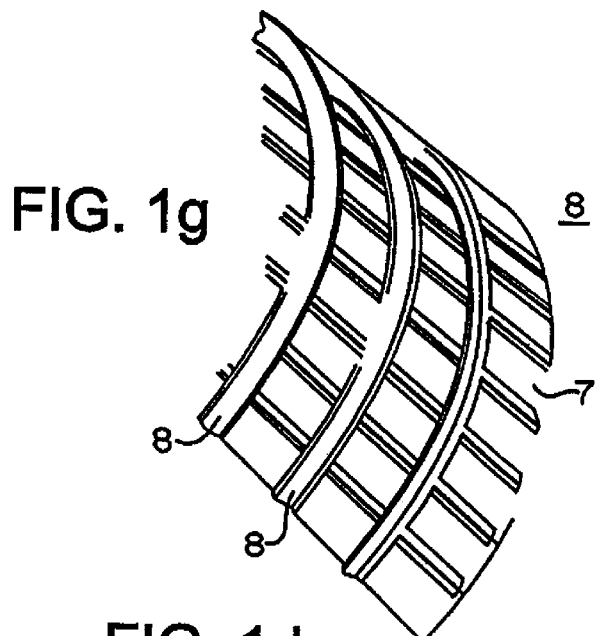
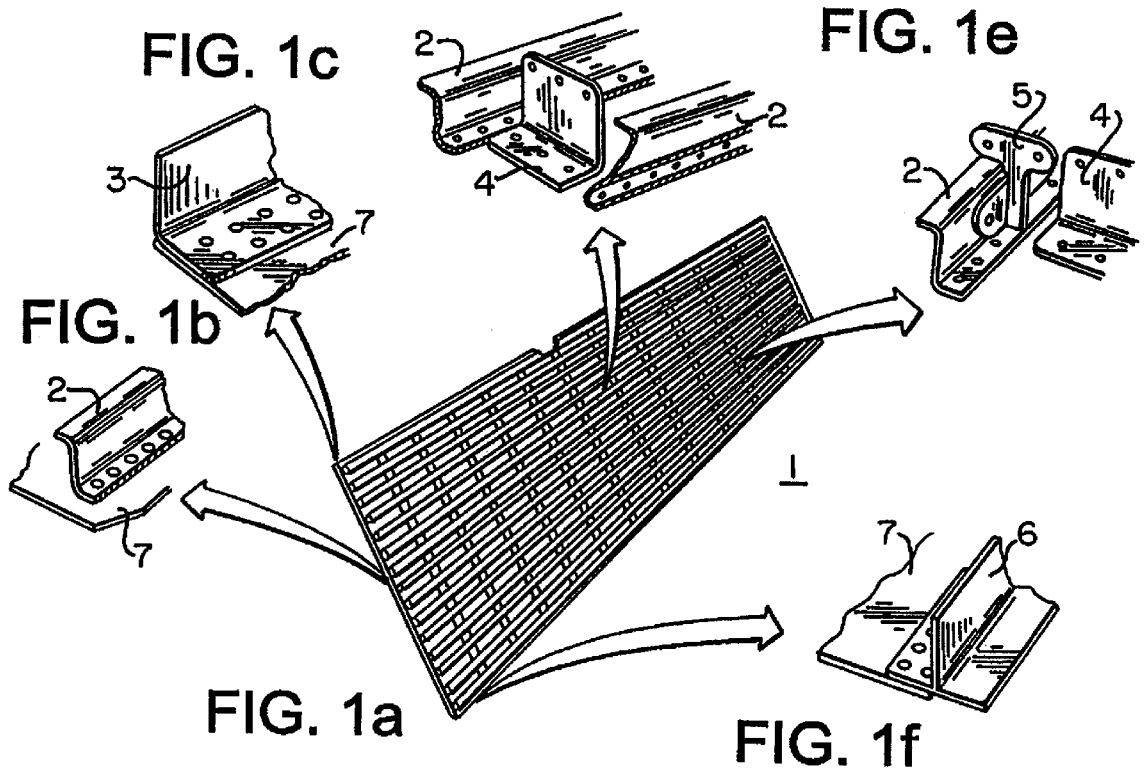

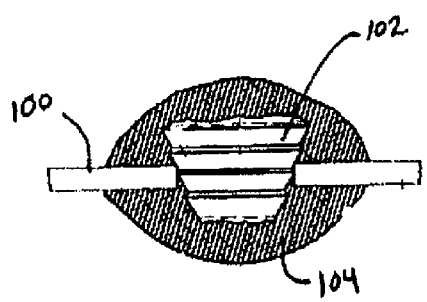
FIG. 10a
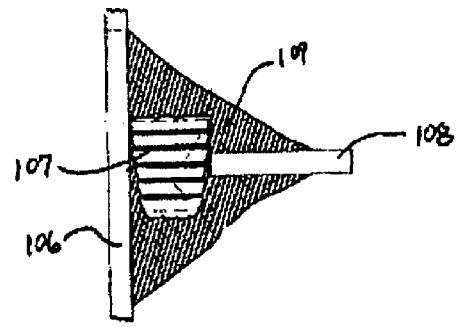
FIG. 10b
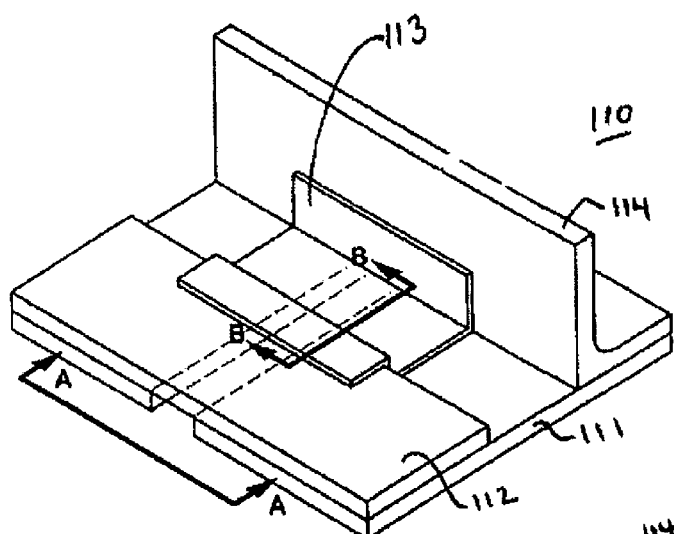
FIG. 11a
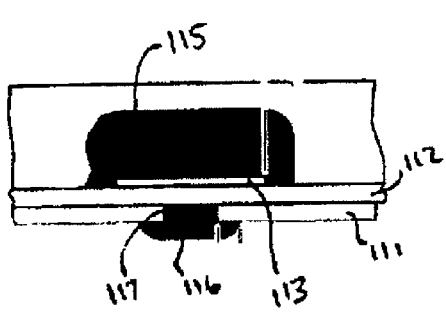
FIG. 11b   VIEW A-A
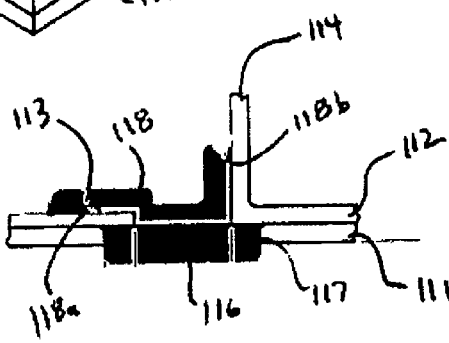
VIEW B-B   FIG. 11c

METHOD AND COMPOSITION FOR SEALING COMPONENTS AND COMPONENTS SEALED THEREBY

CROSS-REFERENCE RELATED APPLICATIONS

This application is a divisional application of U.S. application Ser. No. 10/741,359, filed Dec. 19, 2003, now U.S. Pat. No. 7,202,321, which is a continuation-in-part of U.S. application Ser. No. 10/455,070, filed Jun. 5, 2003, now U.S. Pat. No. 6,809,169, which is a continuation-in-part of U.S. application Ser. No. 10/436,015, filed May 12, 2003, now U.S. Pat. No. 6,797,795, which is a continuation-in-part application of U.S. patent application Ser. No. 10/164,826, filed Jun. 7, 2002, now abandoned, all of which are incorporated by reference herein in their entirety.

FIELD OF THE INVENTION

This invention relates to polymeric coatings and sealants to inhibit corrosion, moisture penetration, and ice formation on substrates, and especially the use of the coatings as fillet seals for adjacent surfaces' points of contact with one another. The present invention further relates to compositions and methods of making and applying to adjacent substrates, as a fillet seal, a composition resistant to corrosion and ice formation.

BACKGROUND OF THE INVENTION

Adjacent surfaces of high performance components are sealed in many ways. For aircraft, the numerous component parts that must be adjoined to construct the aircraft must be sealed and protected, sometimes numerous times. Fillet sealing, gap, and pack void sealing, often in conjunction with faying-surface sealing, provides a barrier at seams or boundaries in the airframe against the passage of unwanted intruding elements and effects, such as, for example, fuel, moisture, pressure, etc. The barrier against moisture must be maintained to combat corrosion. In addition, with respect to aircraft, fillet seal thickness and adhesion, which is based partly upon the total contact surface dimensions, must be great enough to withstand relative movement of the sealed components. In addition, seals such as fillet seals and pack void seals must be free of voids, air pockets, pinholes, reentrant edges, contamination and disbands.

The criticality of maintaining adequate corrosion protection demands that current sealing practices often comprise using a faying-surface seal in conjunction with other sealing such as fillet sealing and pack void sealing, for example. Often the additional sealing is an extension of the faying-surface seal. Presently, there are a number of materials and methods for effecting this protection, e.g., use of wet polysulfide sealant, polyurethane coatings, etc. In addition, the practice of tooling or designing the faying-surface sealant squeeze-out to facilitate fillet sealing is acceptable provided the required size and shape of the fillets are followed and the faying-surface sealant is a fillet-type sealant (Class B sealant). See FIGS. 8a-8g and 8j.

Current wet polysulfide materials used as sealants for aircraft have been acceptable. However, the known methods of applying such polysulfide sealants are highly labor intensive and require considerable clean up after application resulting in significant and expensive time delay in further manufacturing. In addition, the known sealants become hard and brittle with age as diluents are liberated from the sealant.

Along with the desirability of preventing moisture penetration along aircraft seals, the build-up of ice upon the wings and components of an aircraft is of particular concern in the aircraft industry. The lift generated by the wings, and thus the ability of the aircraft to become and remain airborne, is dependent on the shape of the wings. Even a small accumulation of ice upon the surface of the wings can have a huge aerodynamic effect and can dramatically reduce the ability of the wings to lift the aircraft into the air. Further, ice build-up along control surfaces of the aircraft can impede the movement of those surfaces and prevent proper control of the aircraft.

While there are a large variety of techniques used to control the build-up of ice upon the wings and other surfaces of aircraft, e.g. de-icing before takeoff by application of a chemical spray, which melts the ice from the wings, such deicing sprays are often toxic and harmful to the environment.

Another method of de-icing aircraft includes providing flexible pneumatic coverings along the leading edges of the wings, and supplying bursts of air or fluid to the wing through the flexible coverings to break away any overlying ice. Similarly, bleeding air from the aircraft engine and routing the heated air to the surface of the wing heats the wing and melts the ice. Finally, ice may be removed from the wing by providing high-current pulses of electricity to a solenoid disposed within the wing that causes the wing to vibrate, fracturing any accumulated ice.

Although the previously mentioned methods of ice removal are generally effective, they require the continuous supply of air, chemicals, or electrical power in order to rid the wing of its burden. It would be preferred, of course, to prevent the accumulation of moisture and ice in the first place, but past attempts to develop practical passive methods of ice prevention have failed, along with efforts to reduce moisture penetration, i.e. poor barrier to moisture penetration.

In addition, there exists a need for an improved approach for the protection from moisture penetration and ice build-up at adjacent surfaces of aluminum alloy, titanium alloy or composite aircraft structural components that occur at exterior and interior aircraft component locations, such as wing and fuselage skin panels, stiffeners (which include but are not limited to spars, ribs, stringers, longerons, frames, shear clips, "butterfly" clips, etc.), hinges, doors, etc., and the mechanical components attached to these aforementioned components. The structural components are preferably made from aluminum alloy, titanium alloy or composites. Furthermore, there exists a need for improving the delivery methods and systems of such coatings onto the aluminum-alloy, aircraft structural components, including relatively large, surface-area components. Commonly assigned U.S. Pat. No. 6,475,610 discloses such methods and useful coatings for improving the corrosion protection of faying surfaces, and is incorporated by reference herein as if made a part of this present application.

What is needed is a durable sealant material for use in sealing fillet seals and pack void seals, with long lasting corrosion-resistant, moisture-resistant, and anti-icing properties delivered to coat and protect adjacent substrate surfaces.

SUMMARY OF THE INVENTION

The present invention is directed to applying a pliable, polymeric material sealant that can be applied easily to a substrate surface by numerous methods, e.g., syringe applicator, spray gun, etc., that can control material delivery (e.g. thickness and area) so that no or little clean-up is necessary after application to a surface. The polymeric material is preferably a polyurethane/polyurea, polysiloxane, or other hydrophobic polymeric material that can be delivered to a substrate surface to a desired thickness to effect a desired seal such as a fillet seal or a pack void seal.

A preferred polysiloxane (e.g. polysiloxane amide uriede) polymer formulation is produced by mixing a hydrosiloxane prepolymer (or polymer) with an unsaturated hydrocarbon in the presence of a platinum catalyst. Alternatively, a hydrosiloxane prepolymer (or polymer) in the presence of a tin or zinc catalyst can also be used. Similarly, preferred polyurethane/polyurea formulations include a mixture of polyurethane and polyurea polymers with a tin or similar catalyst. A preferred polymeric film is formed that is substantially impervious to corrosive environments and acts as a protective sealant ideally suited for fillet seals.

Further, the present invention is directed to substrates having adjacent surfaces coated with a sealant, said sealant made from a material comprising a polymer formed from a combination of two components: -(Component A)-(Component B)- wherein Component A is represented by the formula shown in (Ia):

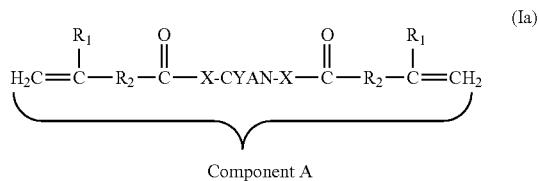

Component A and Component B is represented by either structure, as shown in (Ib) or (Ic):

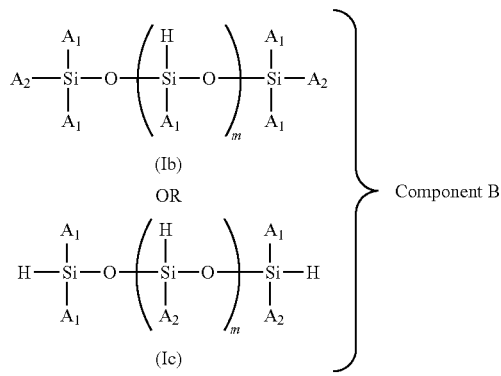

Component B where X is a prepolymer, shown in formula (Id):

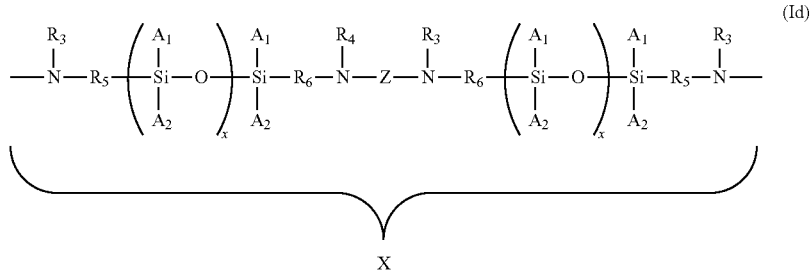

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles; and are preferably methyl;

$R_2$, $R_5$, and $R_6$ are independently selected from the group consisting of $C_1$ to $C_{10}$ alkyls; aryls, and heterocycles;

wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated;

x is a number from 1 to about 10,000, preferably from 1 to about 1000, and most preferably between about 200 and about 500; and, to result in an amine-terminated polysiloxane (amide-ureide), as shown in formula (Ie):

where X is as shown in (Id), CYAN is a diisocyanate residue from the group of alkyl diisocyanate with the alkyl portion being from $C_1$ to $C_{10}$ and non-linear aryl diisocyanate or non-linear heterocyclic diisocyanate, and Z is a residue of a dicarboxylic acid wherein the hydroxyl from each carboxylic acid component has been replaced with a halide constituent, typically chloride. At least a portion of the substituted dicarboxylic acids is selected from fumaryl, succinyl, phthalyl, terephthalyl, and maleiyl halides, and more preferably fumaryl chlorides and maleiyl chlorides. Subsequently, the moiety (Ie) is reacted with an olefinic acid halide, generally represented by the formula shown in (If), as:

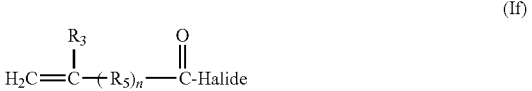

where $R_3$ is as defined above, and $R_5$ is aliphatic, aryl; $C_3$ to $C_6$ cycloaliphatic; and $C_3$ to $C_6$ heterocyclic; wherein the alkyls may be linear or branched, saturated or unsaturated, halogenated on non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated; where n is 0 to 10.

Further, the present invention is directed to a substrate having adjacent surfaces coated with a fillet seal, said seal made from a material comprising a polysiloxane(amide-ureide) having the general formula (III):

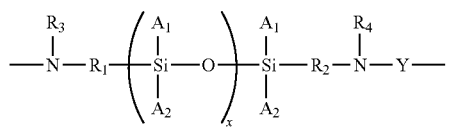

(III)

wherein
$R_1$ and $R_2$ are independently selected from the group consisting of $C_1$ to $C_{10}$ alkyls, aryls, and polyaryls;
$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles, and are preferably methyl;
wherein the alkyls may be linear or branched, saturated or unsaturated, halogenated or non-halogenated; aryls are preferably selected from $C_6$, $C_{10}$, and $C_{14}$ aryls and may be substituted or non-substituted, including alkylaryls and halogenated aryls; polyaryls are two or more aryls linked by at least one carbon-carbon bond and are preferably selected from biphenyl and terphenyl; cycloaliphatics may be saturated or unsaturated, halogenated or non-halogenated; heterocycles may be saturated or unsaturated, halogenated or non-halogenated; and alkylaryls may be linear or branched, saturated or unsaturated, halogenated or non-halogenated;
x is a number from 1 to about 10,000, preferably between about 200 and about 500; and,
Y is selected from a substituted dicarboxyl residue and a diisocyanate residue wherein preferably about 40% to about 60% of the Y component within the polymer is the substituted dicarboxyl residue and the remaining portion of the Y component within the polymer is the diisocyanate residue, and wherein preferably greater than about 50% of the Y components are non-linear. It is the combination of both the dicarboxyl residues and the diisocyanate residues in the same polymer backbone that gives the desirable properties relative to interchain strength and ice inhibiting properties.

A preferred polysiloxane(amide-ureide) is represented by the formula (IV):

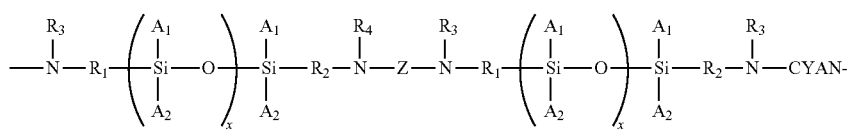

(IV)

wherein each of $R_1$, $R_2$, $A_1$, $A_2$, $R_3$, $R_4$, and x are as defined above, and Z is a dicarboxyl residue and CYAN is a non-linear diisocyanate residue.

The polysiloxane(amide-ureide) is formed by reacting a diamine-terminated polysiloxane, a halide substituted dicarboxylic acid, and a diisocyanate. The beginning diamine-terminated polysiloxane has the general formula (II):

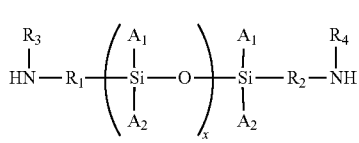

(II)

wherein $R_1$, $R_2$, $R_3$, $R_4$, $A_1$, $A_2$, and x are as defined above.

The halide substituted dicarboxylic acid is a low molecular weight α,ω-dicarboxylic acid wherein the hydroxyl from each carboxylic acid component has been replaced with a halide constituent, typically chloride, and where the dicarboxylic acid may be as long as a 10 carbon dicarboxylic acid. At least a portion of the substituted dicarboxylic acids are preferably selected from unsaturated acids, such as fumaryl, succinyl, phthalyl, terephthalyl and maleiyl halides, and more preferably fumaryl chlorides and maleiyl chlorides.

Still further, the present invention is directed to a polysiloxane(amide-ureide) material for use as a sealant material for use as fillet seals and pack void seals, preferably on an aircraft substrate, said sealant material capable of inhibiting the accumulation of ice upon, or penetration of moisture through the surface of a substrate, a process of producing the polysiloxane(amide-ureide), and a method of applying a sealant made from a polysiloxane (amide-ureide) to structures, particularly vehicles, and most particularly aircraft.

The polysiloxane(amide-ureide) forms a durable, long lasting, anti-ice and moisture-resistant seal when applied to a substrate. The polysiloxane(amide-ureide) sealant material disrupts bonding between the ice or other moisture and the coated substrate. Moreover, when ice does form, the polysiloxane(amide-ureide) sealant disrupts the hydrogen bonding between the ice and the coated surface, thereby diminishing the ability of the ice to adhere to the surface. The ability of the sealant material to adhere to surfaces, and to inhibit the formation of ice upon or penetration of moisture through sealed substrate surface interfaces, makes the polysiloxane(amide-ureide) particularly useful for inhibiting the formation of ice on aircraft or other vehicles.

The present invention is also directed to a method for applying to a substrate having an adjacent surface, a polysiloxane-containing coating, preferably a polysiloxane(amide-ureide) coating capable of inhibiting corrosion, moisture penetration, as well as the accumulation of ice.

BRIEF DESCRIPTION OF THE DRAWINGS

FIG. 1a shows a wing panel substructure assembly.
FIGS. 1b-1f show enlarged partial views of component aspects of the wing panel assembly where faying surfaces occur:
FIG. 1g shows a section of fuselage skin panel substructure assembly with skin panel attached to frames and longerons.

FIGS. 10a-10b show perspective views of plug seals.

FIGS. 11a-11c show perspective views of fillet seals, gap, and pack void seals on joined structures.

DETAILED DESCRIPTION OF THE INVENTION

Figure 2:
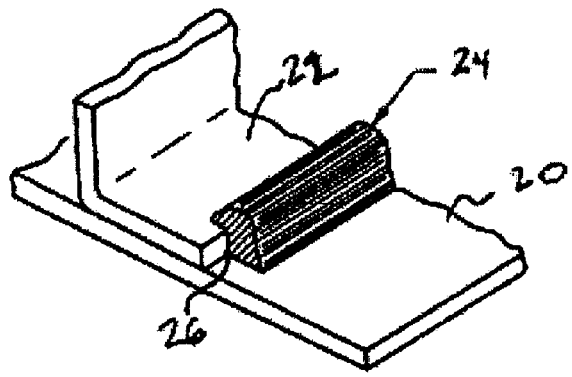
FIG. 2 shows an aircraft substructure component with fillet seal in place at substructure component interface.

The present invention now will be described more fully with reference to various embodiments of the invention. This invention may, however, be embodied in many different forms and should not be construed as limited to the embodiments set forth herein; rather, these embodiments are provided so that this disclosure will be thorough and complete, and will fully convey the scope of the invention to those skilled in the art.

The invention is an improved sealant material for inhibiting corrosion, moisture penetration, and ice formation on adjacent surfaces at the point of contact between components. The sealant materials are preferably used as fillet seals, gap, and pack void seals. The sealant materials of the present invention are particularly effective when applied to aluminum, steel, titanium, glass, ceramic, and carbon composite surfaces and are particularly useful for inhibiting the formation of ice, and the penetration of moisture on the flight and adjacent surfaces of aircraft or space vehicles. The sealant materials also form an effective ice inhibitor when used on a wide variety of substrate materials other than the preferred aluminum, titanium or carbon composite. In addition, the sealant materials may be used as the primary, or sole material to seal adjacent substrate surfaces, or may be used as a secondary coating to overcoat another coating, or the sealant of the present invention itself may be subjected to an overcoat.

For the purpose of this application, it is understood that "adjacent surfaces" are those surface in direct and intimate contact. By contrast, "adjoined surfaces" are those surfaces that directly contact one another through an assembly process.

Faying surfaces are understood to be the interfaces of abutting or mating components that become so intimately and permanently fitted in relation to one another that the point of interface is virtually undetectable after assembly. The use of traditional wet-sealant compounds on the faying surfaces of larger aircraft structural components results in waste, excessive application and clean-up time, toxic waste disposal complications, and increased cost. In addition, in the past, there have been no known attempts at using the polymer coatings of the present invention as anti-corrosive, moisture-inhibiting surface sealants.

Fillet seals are understood to be seals designed to cover the exposed surfaces of adjacent or adjoined surfaces, which may or may not include faying-surface sealant. Pack void seals consist of any sealant disposed into pack voids, which are understood to be any gap or void, hole, etc. occurring on a substrate surface or between substrate surfaces.

Further, the present invention is directed to a sealant made from a material comprising a polysiloxane-containing polymer, preferably a polysiloxane (amide-ureide) coating capable of inhibiting corrosion as well as the accumulation of ice upon the surface of a substrate formed from a combination of two components: -(Component A)-(Component B)- wherein Component A is represented by the formula shown in (Ia):

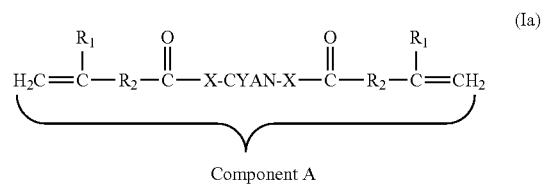

Component A and Component B is represented by either structure, as shown in (Ib) or (Ic):

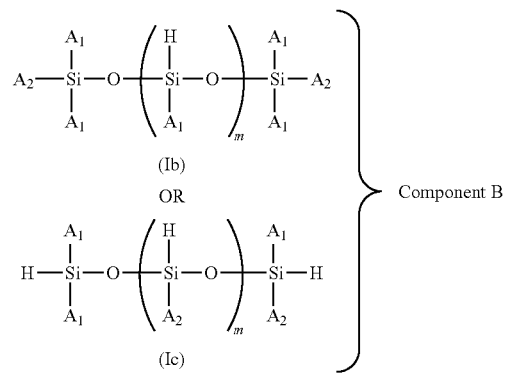

where X is a prepolymer, shown in formula (Id):

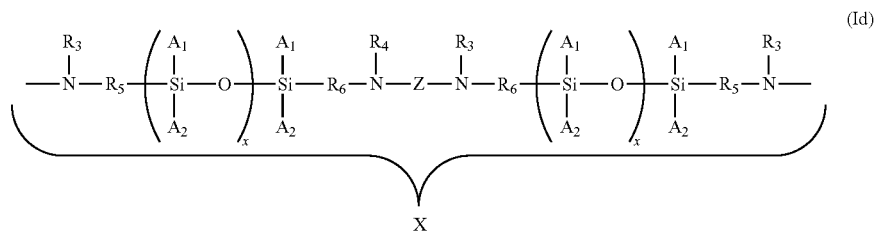

wherein $R_1$, $R_3$, and $R_4$ are independently selected from the group consisting of hydrogen; $C_1$ to $C_6$ alkyls and aryls; $C_3$ to $C_6$ cycloaliphatics; and $C_3$ to $C_6$ heterocycles;

$A_1$ and $A_2$ are independently selected from the group consisting of $C_1$ to $C_6$ alkyls and aryls; $C_7$ to $C_{12}$ alkylaryls; $C_3$ to $C_6$ cycloaliphatics; and $C_3$ to $C_6$ heterocycles; and are preferably methyl; $R_2$, $R_5$, and $R_6$ are independently selected from the group consisting of $C_1$ to $C_{10}$ alkyls; aryls, and heterocycles;

wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated;

x is a number from 1 to about 10,000, preferably from 1 to about 1000, and most preferably between about 200 and about 500; and, to result in an amine-terminated polysiloxane (amide-ureide), as shown in formula (Ie):

$$[X]\text{-CYAN-}[X] \qquad (Ie)$$

where X is as shown in (Id), CYAN is a diisocyanate residue from the group of alkyl diisocyanate with the alkyl portion being from $C_1$ to $C_{10}$ and non-linear aryl diisocyanate or non-linear heterocyclic diisocyanate, and Z is a residue of a dicarboxylic acid wherein the hydroxyl from each carboxylic acid component has been replaced with a halide constituent, typically chloride. At least a portion of the substituted dicarboxylic acids is selected from fumaryl, succinyl, phthalyl, terephthalyl, and maleiyl halides, and more preferably fumaryl chlorides and maleiyl chlorides. Subsequently, the moiety (Ie) is reacted with an olefinic acid halide, generally represented by the formula shown in (If), as:

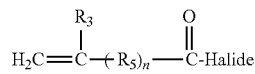

(If)

where $R_3$ is as defined above, and $R_5$ is aliphatic, aryl; $C_3$ to $C_6$ cycloaliphatic; and $C_3$ to $C_6$ heterocyclic; wherein the alkyls may be linear or branched, saturated or unsaturated, halogenated on non-halogenated; aryls may be halogenated or non-halogenated; cycloaliphatics may be saturated or unsaturated, halogenated or non-halogenated; heterocycles may be saturated or unsaturated, halogenated or non-halogenated; and alkyaryls may be linear or branched, saturated or unsaturated, halogenated or non-halogenated; where n is 0 to 10.

The ratio of (Ie) to (If) is two moles of (If) to one mole of (Ie) to result in a product with an unsaturation moiety at the terminal ends of the molecules, as shown in formula (Ia) and which is now called Component A. Subsequently, Component A is reacted with Component B, which is shown as either formula (Ib) or (Ic) in a one mole of A to one mole of B ratio with a platinum catalyst; said catalyst being a platinum-divinyltetramethyldisiloxane complex to result in the sealant material; with the platinum catalyst and Component B being obtained from United Chemical Technologies, Inc. (Bristol, Pa.) and where m is an integer from 1 to about 1000. For cross-linking purposes, the molar ratios of Component A to Component B would be different.

The reaction ideally represented by formula (Ig) involves an addition of the

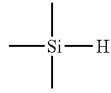

across the olefinic double bond, as shown:

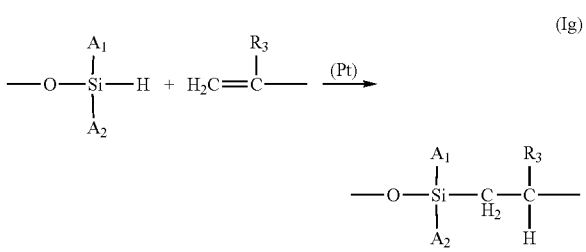

(Ig)

This product of the reaction (Ig), as mentioned above, is now the surface coating with $A_1$ and $A_2$ being independently selected from the group consisting of hydrogen; $C_1$ to $C_6$ alkyls; aryls; $C_7$ to $C_{12}$ alkylaryls; $C_3$ to $C_6$ cycloaliphatics, and $C_3$ to $C_6$ heterocycles; and are preferably methyl;

wherein the alkyls may be linear or branched, saturated or unsaturated, halogenated or non-halogenated; aryls may be halogenated or non-halogenated; cycloaliphatics may be saturated or unsaturated, halogenated or non-halogenated; heterocycles may be saturated or unsaturated, halogenated or non-halogenated.

The beginning diamine-terminated polysiloxane obtained from United Chemical Technologies, Inc. (Bristol, Pa.) has the general formula (II):

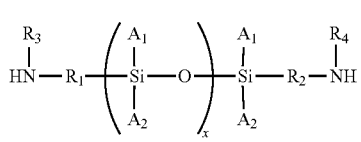

(II)

wherein $R_1$, $R_2$, $R_3$, $R_4$, $A_1$, $A_2$, and x are as defined above.

The halide substituted dicarboxylic acid is a low molecular weight dicarboxylic acid wherein the hydroxyl from each carboxylic acid component has been replaced with a halide constituent, typically chloride. At least a portion of the substituted dicarboxylic acids are preferably selected from fumaryl, succinyl, phthalyl, terephthalyl and maleiyl halides, and more preferably fumaryl chlorides and maleiyl chlorides.

To prepare the preferred polymer, two moles of the amine-terminated polysiloxane is first reacted with one mole of a dicarboxylic halide to form a polyamide intermediate (formula (V). After formation of the polyamide, two moles of the polyamide is reacted with one mole of a non-linear diisocyanate to form the polysiloxane(amide-ureide) of formula (IV). Use of fumaryl halides, phthaloyl halides, and maleiyl halides as the dicarboxylic acid halides and use of the non-linear diisocyanate result in a polysiloxane(amide-ureide) with a decidedly non-linear orientation. Thus, the resulting polymer (IV) contains functional amide groups, functional urea groups, and is amorphous rather than crystalline in nature, due to the non-linear orientation of the polymer molecules. Each of the amide functionality, the urea functionality, and the non-linearity of the polymer improve the polymer's strength or anti-icing properties. Furthermore, the amide/urea moieties create crystallinity within the polymer via intermolecular hydrogen bonding which, in conjunction with the amorphous nature of the polysiloxane and the non-linearity of the diacid or diisocyanate, create a toughened polymer with enhanced physical properties.

The polysiloxane(amide-ureide) may be applied to a substrate in a number of ways. For instance, it may be applied to substrate surfaces by simply spraying the polymer composition upon a substrate. As a one-component spray, a solution of the polysiloxane(amide-ureide) in methylene chloride/toluene mixture (1:1 ratio) is sprayed onto a substrate to be coated. After the solvent is removed, a uniform film of polymer is left behind.

As a two-component system, the amine-terminated polyamide intermediate (V) is dissolved in the methylene chloride/toluene mixture and in another mixture of methylene chloride/toluene is dissolved the stoichiometric amount of diisocyanate (VII). The two mixtures are combined in a common spray nozzle and mixed while being sprayed onto a dry substrate under inert atmosphere conditions to form a polysiloxane(amide-ureide) coating on the substrate.

Alternatively, the polysiloxane(amide-ureide) may be dissolved in a solvent, such as methylene chloride at a concentration of about 50 percent solids and sprayed onto the substrate. The solvent, being low boiling, evaporates rapidly and a film of polysiloxane(amide-ureide) is left behind.

Alternatively, the polyamide intermediate (V) is mixed with a methylene chloride solution of a polyisocyanate (VII), where m>2) at a mixing nozzle of, for example, a spray gun and ejected onto the substrate. This process results in a crosslinked polymer, which cures within a few minutes to a firm crosslinked film.

In a one component spray, the polysiloxane(amide-ureide) is capable of being handled or walked upon as soon as the solvent has all evaporated. Use of a heat source, such as hot air or infrared lamps, will accelerate the solvent removal. In the two component system, the polysiloxane(amide-ureide) forms almost as soon as the two parts are mixed and sprayed onto the substrate. Again use of hot air or heat lamps will facilitate solvent removal to leave behind a useable film.

The sealant material of the present invention may be formulated to be clear, and may be applied onto a wide variety of surfaces, including painted surfaces. Alternatively, the coating may be pigmented by mixture of one or more of the reaction components with a suitable pigment in a colloid mill. The pigmented coating may then be used as a paint.

The polysiloxane(amide-ureide) is hydrophobic and tends to displace any moisture upon surfaces when applied, therefore the polysiloxane(amide-ureide) may be applied successfully to wet or damp surfaces. The polymer can be applied to any surface in temperature conditions of from between about minus 40° F. and about 250° F., and the polymer coating is stable to about 350° F. The coating may be applied in a single layer having any desired thickness, eliminating the need for multi-coat applications.

The coating also may be applied as an appliqué by first depositing the coating, as described above, upon a relief surface such as Teflon™. When dry, the coating may be removed from the release surface and used in an appliqué process.

In one preferred application method, the combination of Component A and Component B may be applied in neat form by having Component A and Component B in two separate reservoirs, for example, within a spray gun with the catalyst included in Component A (formula (Ia)). By pressurizing the solutions to about 2500 psi (with a pre-adjusted stoichiometric ratio in each reservoir) and forcing them to mix at the nozzle of a spray gun, such as a Gusmer VH-3000 gun, at ambient or elevated temperature, said temperatures not to exceed 60° C., the reaction between component A and Component B begins immediately upon mixing and deposits on the substrate as a coherent film. For cross-linking purposes, the Component B may contain a mixture of (Ib) and (Ic), such that (Ib) is in slight excess, but still maintaining an equivalent stoichiometry of (Ia) to the total amount of hydride moieties.

As an alternative to the neat reaction, the solutions of A and B may be dissolved in a solvent such as a toluene/methylene chloride mixture (1:1 ratio) and the subsequent solutions mixed at the nozzle of the spray gun (as was done in the neat reaction). Upon deposition on the substrate, the solvent will flash off and leave a coherent film as a fillet seal on the substrate surface.

The sealant material used to make the seals of the present invention are particularly effective when applied to coated or uncoated metal, including aerospace alloys of aluminum, steel, or titanium or to resin composites having glass, ceramic, or carbon fiber reinforcement and are particularly useful for inhibiting the formation of ice upon, or penetration of moisture into the control or aerodynamic lifting surfaces of aircraft or space vehicles. The coating also forms an effective ice inhibitor when used on a wide variety of substrate materials other than the preferred aluminum, titanium or carbon composite, such as, for example, glass.

Further, the present invention is directed to a substrate having a seal such as a fillet seal or a pack void seal. The seal is made from a material comprising a polysiloxane-containing polymer, preferably a polysiloxane (amide-ureide) polymer capable of inhibiting corrosion and moisture penetration, as well as the accumulation of ice when applied as a coating to the surface of a substrate, the polymer having the general formula (III):

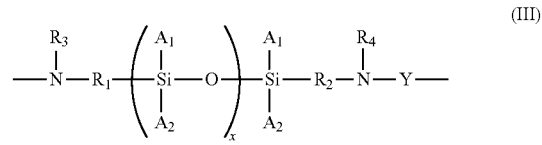

(III)

wherein $R_1$ and $R_2$ are independently selected from the group consisting of $C_1$ to $C_{10}$ alkyls, aryls, and polyaryls;

$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles, and are preferably methyl;

x is a number from 1 to about 10,000, preferably from about 1 to about 1000, and most preferably between from about 200 and about 500; and, Y is selected from a substituted dicarboxyl residue and a diisocyanate residue wherein preferably about 40% to about 60% of the Y component within the polymer is the substituted dicarboxyl residue and the remainder of the Y component within the polymer is the diisocyanate residue, and wherein preferably greater than about 50% of the Y components are non-linear.

The alkyls may be linear or branched, saturated or unsaturated, halogenated or non-halogenated. The aryls are preferably selected from $C_6$, $C_{10}$, and $C_{14}$ aryls and may be substituted or non-substituted, including halogenated or non-halogenated aryls. The aryls may include alkylaryls and the alkylaryls may be linear or branched, saturated or unsaturated, halogenated or non-halogenated. The polyaryls are two or more aryls linked by at least one carbon-carbon bond and are preferably selected from biphenyl and terphenyl. The polyaryls may be linear or branched, and substituted or non-substituted, including halogenated or non-halogenated. The heterocycles may be saturated or unsaturated, halogenated or non-halogenated.

The polysiloxane(amide-ureide) is formed by reacting an amine-terminated polysiloxane, a halide substituted dicarboxylic acid, and a diisocyanate.

A preferred coating is comprised of a polysiloxane(amide-ureide) polymer having the general formula (IV):

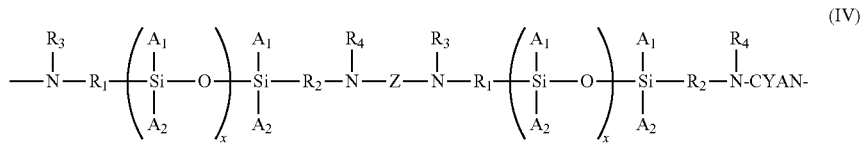

(IV)

wherein each of $R_1$, $R_2$, $A_1$, $A_2$, $R_3$, $R_4$, and x are as defined above, and Z is a dicarboxyl residue and CYAN is a diisocyanate residue.

The preferred polysiloxane(amide-ureide) is created by first reacting a diamine-terminated polysiloxane as shown below in formula (II) with a halide substituted dicarboxylic acid, examples of which are shown as formula (VI), to form a polyamide intermediate, shown below as formula (V). The polyamide intermediate (V) is then reacted with a non-linear isocyanate shown as formula (VII) to form the polysiloxane (amide-ureide) (IV). Each of the reactants and each of the process steps are described in greater detail below.

The beginning amine-terminated polysiloxane has the general formula (II):

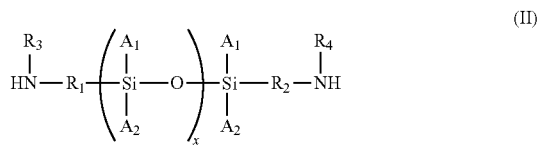

(II)

wherein $R_1$, $R_2$, $R_3$, $R_4$, $A_1$, $A_2$, and x are as defined above. If any of the $R_1$, $R_2$, $R_3$, $R_4$, $A_1$, $A_2$ groups are aryl, then those aryl groups are preferably phenyl.

$A_1$ and $A_2$ need not be regularly repeating patterns of hydrogen, alkyl, aryl, or polyaryl groups. For instance, the polysiloxane (II) may have a wide variety of randomly dispersed $A_1$ and $A_2$ groups throughout the length of the polysiloxane.

Although the number of repeat units, x, in the polysiloxane (II) may be as low as one, the average is generally between about 200 and 1,000, and is preferably between about 200 and 500. The polysiloxane may be linear or branched. When branched, the $R_1$, $R_2$, $A_1$, or $A_2$ groups are a site of branching. Branching is one method of obtaining a crosslinked end-product.

Polysiloxane diamines such as those of formula (II) are commercially available from United Chemical Technologies, Inc. in Bristol, Pa., and also from Dow Chemical Co., Midland, Mich. The preferred polysiloxanes are linear, though branched polysiloxanes may also be used.

A halide substituted dicarboxylic acid ("diacid halide") is reacted with the polysiloxane (II) to form the intermediate polyamide (V):

The halide substituted dicarboxylic acid used in the reaction is a low molecular weight dicarboxylic acid wherein the hydroxyl group from each carboxylic acid component has been replaced with a halide constituent. The dicarboxylic acid is either an aliphatic or aromatic compound with halogen substituted carboxylic acid endgroups. Preferred aliphatic dicarboxylic acid components have ten or less carbons, with examples of the diacid halides including but not limited to malonyl halides, succinyl halides, glutaryl halides, adipyl halides, sebacyl halides, maleiyl halides, and fumaryl halides. Examples of aromatic substituted dicarboxylic acids include terephthalic acid or phthalic acid. Polyfunctional substituted dicarboxylic acids may be used with the invention to promote crosslinking.

Examples of commercially available aliphatic substituted dicarboxylic acid components are fumaryl chloride, succinyl chloride, and maleiyl chloride, each available from Aldrich™ of Milwaukee, Wis.

Preferably, at least a portion of the substituted dicarboxylic acids, Z, used to form the polysiloxane(amide-ureide) (IV) are selected from fumaryl halides and maleiyl halides. The fumaryl and maleiyl halides are trans and cis variations of one another having the following formulas:

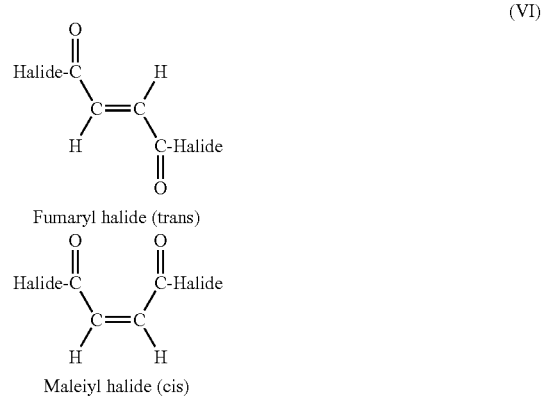

(VI)

Fumaryl halide (trans)

Maleiyl halide (cis)

The incorporation of the fumaryl halide and/or the maleiyl halide act to limit the degree of freedom of the polysiloxane (amide-ureide) (IV) produced by the reaction of the polysiloxane diamine (II) and the dicarboxylic acid halide (VI). When reacted, the amine groups of the diamine polysiloxanes (II) displace the halides and bond with the carboxyl carbon of

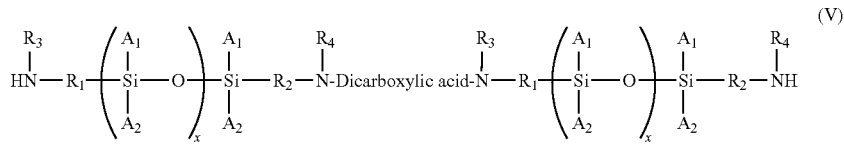

(V)

the fumaryl halides or maleiyl halides. Once bonded, the unsaturated carbon linkage prevents the resulting polyamide (V) from rearranging into a stable spatial orientation, and is particularly useful in preventing the polysiloxane (V) from taking on a linear or near-linear orientation.

The degree of linearity of the polyamide (V), and therefore of the resulting polysiloxane(amide-ureide) (IV) is determined by the relative amounts of fumaryl halide and maleiyl halide (VI) in relation to saturated halide substituted dicarboxylic acids used in the formation of the polyamide. The addition of saturated acid halides, such as succinyl chloride, allow the polyamide (V) to rotate and orient about the succinyl saturated carbon-carbon bond, thus allowing the polyamide (V) and resulting polysiloxane(amide-ureide) (IV) to orient in a near-linear orientation. Saturated acid halides such as succinyl, malonyl or other saturated acid halides may be used in conjunction with the unsaturated acid halides to create a polyamide (V) having a combination of crystalline and amorphous regions in order to control the toughness of the resultant polysiloxane(amide-ureide) (IV).

The polysiloxane(amide-ureide) (IV) shows improved anti-icing properties and inhibits moisture penetration when formed into an amorphous structure with some small amount of crystallinity for enhanced toughness. Maleiyl or fumaryl halide cause the structure of the polymer to be non-linear about the carbon-carbon double bonds in the maleiyl and fumaryl entities. The combined maleiyl and fumaryl, or other unsaturated diacid halide, content is therefore preferably greater than 50 mol % of the dicarboxylic acid halide used in preparation of the polysiloxane(amide-ureide) (IV). It is more preferable that the unsaturated diacid halides comprise between about 75% and 99% of the diacid halides. The disorientation caused by the fumaryl halide and maleiyl halide give the resulting polysiloxane(amide-ureide) an amorphous structure, but the introduction of a saturated diacid halide helps to increase the toughness of the polymer compared with linear polymers having amide or ureide moieties. The non-linear orientation of the polymer makes the polysiloxane (amide-ureide) less brittle than polyureides produced with linear diisocyanates such as methylene diphenyl diisocyanate. Being less brittle, the polysiloxane(amide-ureide) is more durable than industrially available polyureides, and is able to resist the environment associated with ice formation without being damaged.

The formation of the polyamide intermediate (V) takes place by reacting an excess of the diamine polysiloxane (II) with a given amount of dicarboxylic acid halide (VI), preferably in a molar ratio of about 2:1. The reaction is generally performed in a solvent such as methylene chloride, tetrahydrofuran, or toluene. The amine-terminated polysiloxane (II) is added to the diacid halide (VI) in the presence of an acid acceptor such as triethylamine, at elevated temperature, for instance 50° C. As such, the average resulting polyamide intermediate (V) has amine endgroups:

Various polymerization products will result from the combination of the diamine polysiloxane (II) with the given amount of dicarboxylic acid halide (VI). However, based on stoichiometry, the intermediate (V) is what will be predominantly obtained. Thus, based upon the best known average molecular weight values, and the functionality of the reactants, a large percentage of the intermediate (V) will be formed.

After forming the polyamide intermediate (V), the polyamide intermediate is reacted with a non-linear isocyanate (VII) to form the polysiloxane(amide-ureide) (IV). The non-linear isocyanates generally have the structure of formula (VII):

X—[NCO]$_n$ (VII)

where $n \geq 2$, and where X is an aliphatic or aromatic moiety and the isocyanate groups are bound to the X moiety so as to be positioned in a non-linear relationship with respect to one another. The amine endgroups of the polyamide (V) react with the isocyanate endgroups of the non-linear isocyanates (VII) to form urea linkages.

When n=2, the diisocyanates (VII) are reacted in a solvent bath with the polyamide intermediate (V). The reaction preferably occurs directly after reacting the polysiloxane (II) with the diacid halide (VI) within the same solvent bath, but at room temperature, rather than 50° C.

As with the non-linear dicarboxylic acids, the purpose of utilizing a non-linear diisocyanate is to give the resulting polysiloxane(amide-ureide) an overall non-linear orientation, which results in a polymer that is more amorphous and less crystalline. Non-linear aliphatic or aromatic diisocyanates may be used, with ortho or meta oriented aromatic diisocyanates being preferred.

The functionality of the diisocyanates is gained from the dual isocyanate groups being located in a non-linear relationship around an aliphatic or aromatic carbon structure. Polyisocyanates, i.e., those compounds having three or more isocyanate groups, may be used for enhanced crosslinking of the resulting polysiloxane(amide-ureide) (IV). Otherwise, the diisocyanates may be unsubstituted or substituted with groups such as alkyl, alkoxy, halogen, benzyl, allyl, unsubstituted or substituted aryl, alkenyl, alkinyl, amide, or combinations thereof.

Examples of acceptable diisocyanates include 1,5-naphthalene diisocyanate, 4,4-diphenyl-methane diisocyanate, tetra-alkyl-diphenyl methane diisocyanate, 1,3-phenylene diisocyanate, 1,4-phenylene diisocyanate, butane-1,4-diisocyanate, hexamethylene 1,6-diisocyanate, 2,2,4-trimethyl-hexamethylene 1,6-diisocyanate, 2,4,4-trimethyl-hexamethylene 1,6-diisocyanate, cyclohexane-1,4-diisocyanate, xylilene diisocyanate, dicyclohexyl-methane-4,4'-diisocyanate, methyl-cyclohexane diisocyanate, 1,4-tetramethylene diisocyanate, hexamethylene diisocyanate, 1,3-trimethylene diisocyanate, metaxylene diisocyanate, decamethylene 1,10-diisocyanate, cyclohexylene 1,2-diisocyanate, cyclohexylene 1,4-diisocyanate, 1-methyl cyclohexane 2,4-diisocyanate, 2,4-toluene diisocyanate, hexamethylene-1,6-diisocyanate,

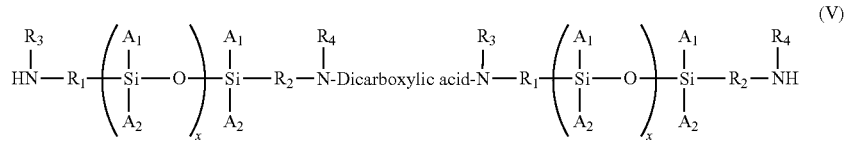

(V)

heptamethylene-1,7-diisocyanate, 1,3-cyclopentene diisocyanate, and 1,3-cyclohexane diisocyanate, most of which are commercially available from Aldrich™ of Milwaukee, Wis.

Other exemplary diisocyanates include those described in U.S. Pat. Nos. 6,008,410 and 6,353,135.

The polysiloxane(amide-ureide) resulting from the combination of the polyamide (V) and isocyanate (VII) has the general formula (IV):

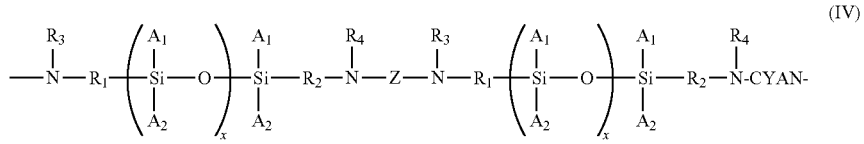

(IV)

with $R_1, R_2, R_3, R_4, A_1, A_2$, x as defined above, and wherein Z represents a dicarboxylic acid group; and CYAN represents a diisocyanate group.

Various permutations of the preferred polymer of the present invention, general formula (IV), may be produced by using the above described reactants and the above described reaction conditions, but by changing the order of reaction from the order used to create the preferred embodiment (IV).

For instance, a polysiloxane (II) and a diisocyanate (VII) may be reacted with a diacid halide in a common solvent solution such that the molar ratios of the reactants are 2:1 (polysiloxane:diisocyanate) and 2:1 (combination of polysiloxane and diisocyanate:diacid halide). The reaction results in amine-terminated products. The amine-terminated products are reacted with a second diacid halide, which may be the same or different from the first diacid halide, to form a random copolymer(amide-ureide).

In another embodiment, it is possible to create block copolymers of the polysiloxane(amide-ureide). To create the block copolymer, a first amine-terminated polysiloxane (II) is reacted with a diacid halide (VI), preferably in a molar ratio of 2:1 (polysiloxane:diacid halide) to form a first product. Separately, a second amine-terminated polysiloxane (II) is reacted with a diisocyanate (VII), preferably in a molar ratio of 2:1 (polysiloxane:diisocyanate) to form a second product. The two products (each amine-terminated) are then reacted with a second diacid halide, which may the same or different from the first diacid halide, to result in a block copolymer(amide-ureide).

The polysiloxane(amide-ureide)s of the present invention have several advantageous properties and applications making them superior, durable, and long-lasting anti-icing agents that can be used on a variety of surfaces and surface materials.

It has been found that the urea groups of the polysiloxane (amide-ureide)s act to disrupt the hydrogen bonding between molecules of water, which inhibits moisture penetration as well as inhibiting the formation of ice and also greatly diminishes the adhesion of ice to the polysiloxane(amide-ureide)s when the polysiloxane(amide-ureide)s are used as a coating layer upon a substrate. Therefore, the polysiloxane(amide-ureide)s of the present invention act first to inhibit the accumulation of moisture and the formation of ice, and secondly to inhibit the ability of ice to adhere to a coated surface. The polysiloxane portion of the polymer chain is hydrophobic, hence water does not readily sheet out, but tends to bead up. The urea moiety, in weakening the hydrogen bonding of the water molecule, causes the resultant ice to have a weak structure which prevents water from forming a strong ice crystal layer upon a coating of the polysiloxane(amide-ureide)s, thus allowing it to be easily broken away from the coating.

Therefore, the polysiloxane(amide-ureide) may be applied not only as a sealant to discrete seal locations, but also as a continuous coating upon a wide variety of surfaces, particularly metal surfaces such as aluminum or titanium. The coating may also be suitably applied to painted surfaces or to composite surfaces such as resin matrices of graphite or glass fibers, as well as other non-metallic surfaces. Because the coating is continuous, water and moisture cannot penetrate the coating. It is believed that the penetration of water into sintered coatings, such as Teflon™, result in the gradual degradation in icephobic properties of such sintered coatings. There is no such related degradation in the invented polysiloxane(amide-ureide).

Thus, the polysiloxane(amide-ureide) has moisture penetration inhibiting properties, and anti-icing properties not previously found in polyamides. It has degradation resistance not previously found in polyureides. And, it has physical toughness and durability not previously found in polyamides or polyureides.

The usefulness of the polysiloxane(amide-ureide) is not limited to metal surfaces. The polysiloxane(amide-ureide) is useful as a coating on any of a wide variety of substrates such as carbon composites, and even wood or asphalt, a number of which may be applications unrelated to vehicles and aircraft.

The present invention relates to using the polysiloxane coatings of the present invention to coat any aircraft structural components including, for example, wing and fuselage skin panels, stiffeners, stringers, spars, clips, frames, etc. FIG. 1a shows an aircraft wing panel assembly 1 prior to affixing the aluminum skins. The panel assembly 1 comprises hardware shown in enlarged FIGS. 1b-1f. FIG. 1b shows a stringer 2 attached to wing panel skin 7. FIG. 1c depicts a spar cap 3 attached to wing panel skin 7. FIG. 1d shows an angled shear clip 4 in position between stringers 2. FIG. 1e shows a butterfly clip 5 in position adjoining a stringer 2 and a shear clip 4. FIG. 1f shows a center spar clip 6 affixed to a section of wing panel skin 7. Finally, FIG. 1g depicts a section of fuselage structure showing framing 8 affixed to fuselage skin 7. These components preferably have their faying surfaces "precoated" following the completion of their normal fabrication cycle, but prior to final assembly. Large sections of metallic/non-metallic components also could be coated during or after final assembly.

Figure 3:
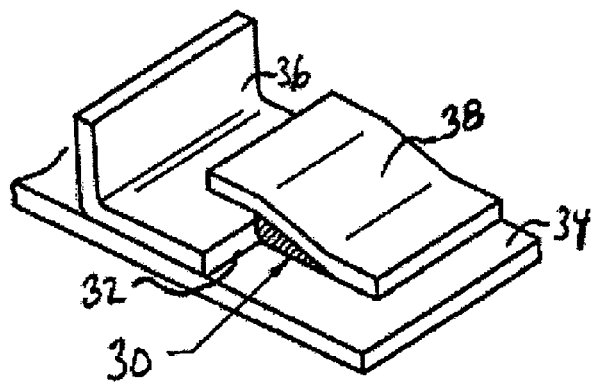
FIG. 3 shows an injection seal interposed at an aircraft substructure component interface.

FIG. 2 shows a first component 20 joined to a second component 22 with a fillet seal 24 made from the polysiloxane (amide-ureide) sealant material of the present invention applied to cover the exposed interface 26 between adjoined surfaces of 20, 22. It is understood that a faying-surface sealant (not shown) could be present between the adjoined surfaces of components 20, 22, and that the fillet seal would cover the exposed faying-surface sealant. FIG. 3 shows a fillet seal made from the polysiloxane(amide-ureide) sealant material of the present invention 30 in place covering the exposed interface surface 32 of components 34, 36. As shown, the fillet seal 30 is itself covered by a third component 38.

Figure 4:
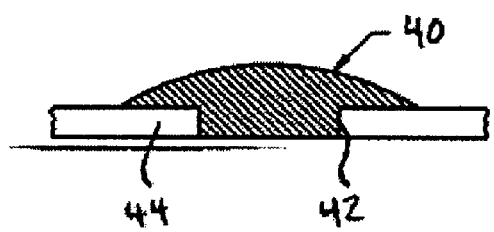
FIG. 4 shows a hole-filling seal in an aircraft substructure component.

FIG. 4 shows yet another embodiment of the present invention whereby the polysiloxane(amide-ureide) of the present invention is applied as a void pack sealant. FIG. 4 shows a cross-sectional view of a pack void seal made from the polysiloxane(amide-ureide) sealant material of the present invention 40 applied to the void 42 of a component 44.

Figure 5:
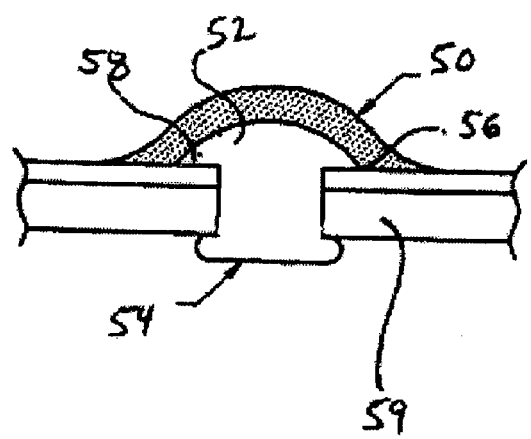
FIG. 5 shows a fastener encapsulation seal on an aircraft substructure component.

FIG. 5 shows a cross-sectional view of a fillet seal made from the polysiloxane(amide-ureide) of the present invention 50 applied to cover a fastener head 52 of a fastener 54 and the faying-surface interface 56 adjacent to the periphery 58 of the fastener head 52 and the component surface 59.

Figure 6:
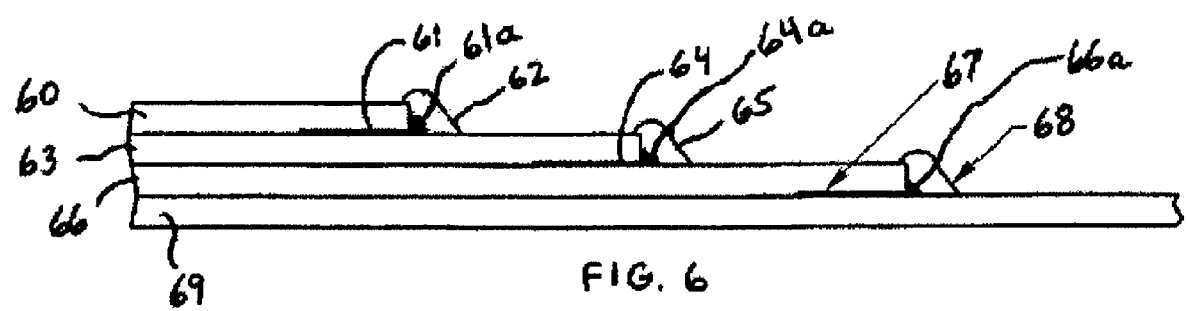
FIG. 6 shows fillet seals applied to structure surfaces over faying-surface sealant.

FIG. 6 is a cross-sectional view of series of joined components 60, 63, 66, and 69. Faying-surface sealant 61 is disposed between components 60 and 63. Faying-surface sealant 64 is disposed between components 63 and 66. Faying-surface sealant 67 is disposed between components 66 and 69. Fillet seals 62, 65, and 68 made from the polysiloxane(amide-ureide) sealant material of the present invention are shown covering the faying-surface sealant "squeeze out" 61*a*, 64*a*, and 66*a*, respectively.

Figure 7:
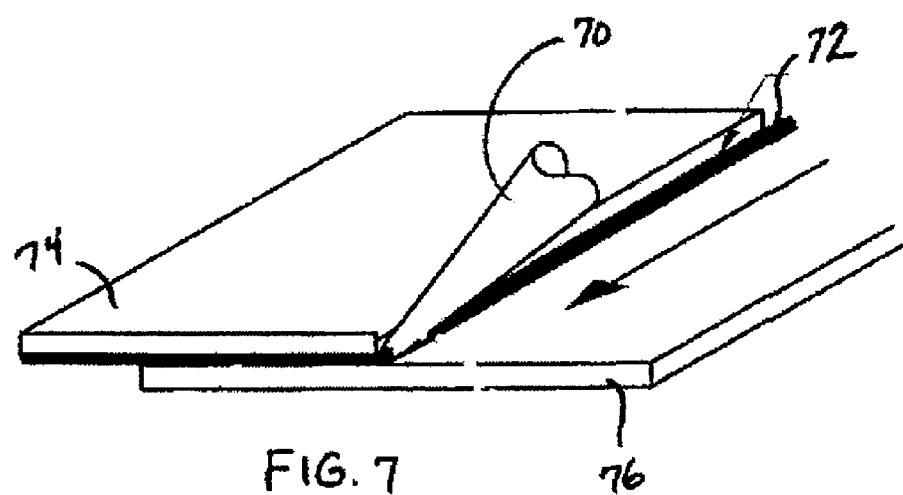
FIG. 7 shows an apparatus for applying the novel sealant as a fillet seal along the interface of two surfaces.

FIG. 7 is a partial perspective view of a method used to apply a fillet seal made from the polysiloxane(amide-ureide) sealant material of the present invention to cover the faying surface. FIG. 7 shows the nozzle 70 for a sealant delivery apparatus (not shown) able to apply a fillet seal to the edge of the faying surface 72 occurring at the interface of components 74 and 76.

Figure 8A:
FIGS. 8a-8j show cross-section views of encapsulation, pack void, gap, and fillet seals.
Figure 8B:
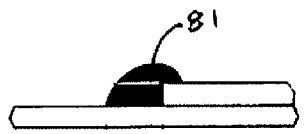
Figure 8C:
Figure 8D:
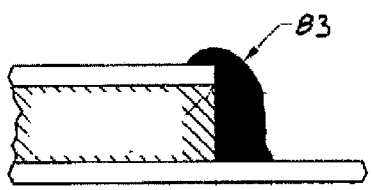
Figure 8E:
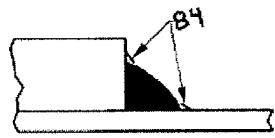
Figure 8F:
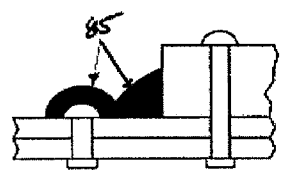
Figure 8G:
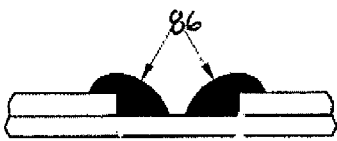
Figure 8H:
Figure 8I:
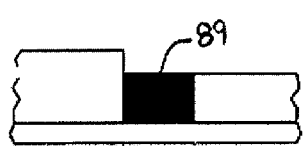
Figure 8J:
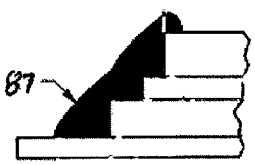

FIGS. 8*a*-8*g* and 8*j* show cross-sectional views of various types of fillet seals 80-87, applied to the faying-surface interface between adjoined components. FIGS. 8*h* and 8*i* show cross-sectional views of pack void seals 88 and 89 made from the polysiloxane(amide-ureide) sealant material of the present invention applied to the faying-surface interface between adjoined components.

Figure 9A:
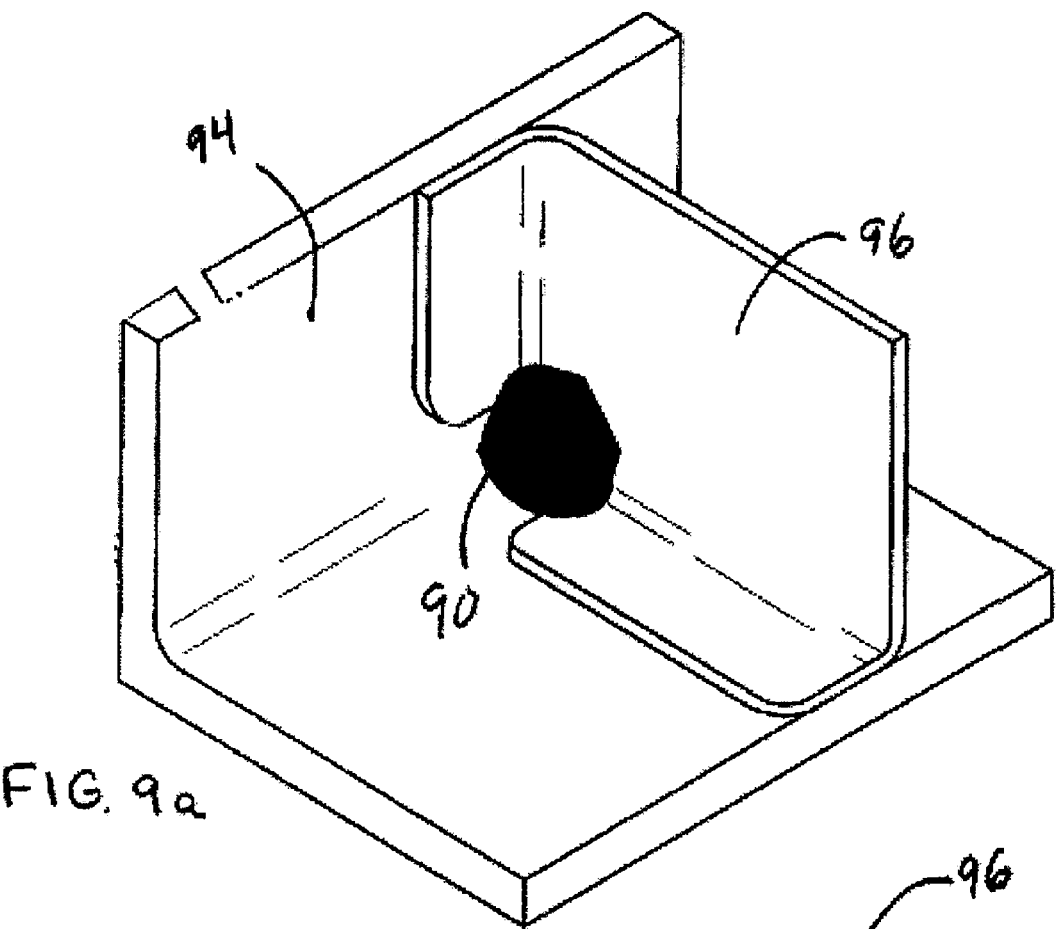
FIGS. 9a-9b show perspective views of a seal for flanges of a fuel tank corner.
Figure 9B:
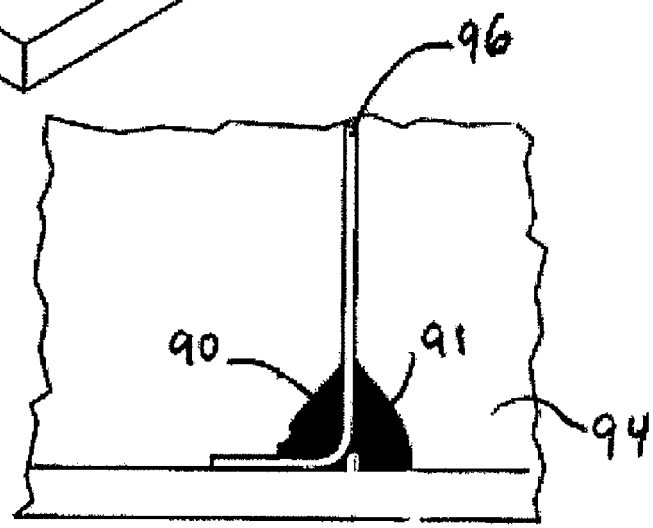

FIGS. 9*a* and 9*b* show perspective and cross-sectional views, respectively, of seals 90 and 92 applied to cover the edge of the faying surface adjacent the adjoined fuel tank components 94 and 96.

FIG. 10*a* shows a cross-sectional view of a component 100 into which a plug seal 102 has been placed. A fillet seal 104 made from the polysiloxane(amide-ureide) sealant material of the present invention is shown enveloping the plug seal/component interface. FIG. 10*b* shows a cross-sectional view of a vertically-oriented component 106 and a proximal horizontally-oriented component 108 separated by a void into which a plug seal 107 has been placed. A fillet seal 109 is shown enveloping the plug seal/components interface.

FIG. 11*a* shows a perspective view of a component assembly 110 comprised of multiple adjoined sub-components 111, 112, 113, and 114. FIG. 11*b* is a sectional view A-A of component assembly 110 taken along Line A-A in FIG. 11*a*, showing a fillet seal 115 made from the polysiloxane(amide-ureide) sealant material of the present invention covering the edges of the faying surface occurring at the interface of components 112 and 113. A pack void seal 116 is shown applied into a void 117 in component 111, with the pack void seal 116 filling the void 117 of component 111 and covering the faying surface occurring at the interface of components 111 and 112. FIG. 11*b* is a sectional view B-B of component assembly 110 taken along Line B-B in FIG. 11*a*, and showing a fillet seal 118 covering the edges of the faying surfaces 118*a* and 118*b* occurring at the interface of components 112 and 113, and the interface of components 113 and 114 respectively. Void pack seal 116 is shown applied into void 117 of component 111 and covering the edges of the faying surface occurring at the interface of components 111, 112, and 114.

Figure 12:
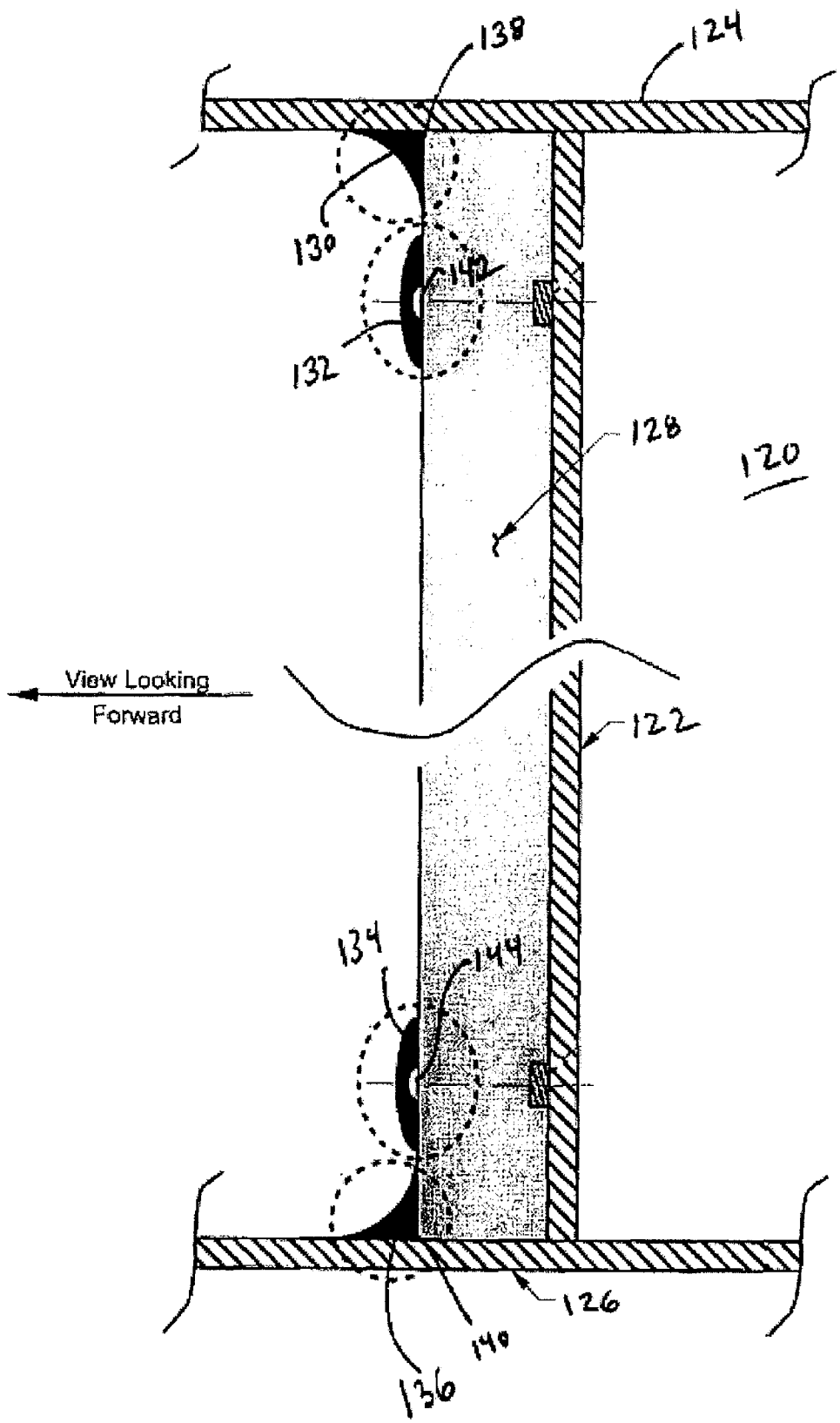
FIG. 12 shows a cross-section, and enlarged perspective views of fillet and encapsulation seals on an aircraft engine inlet structure.

FIG. 12 shows a cross-sectional view of a portion of an engine inlet duct 120 comprising a bulkhead 122 joined to an upper skin 124 and a lower skin 126, with a blanket 128 adjacent the two skins and the bulkhead. Fillet seals 130, 132, 134, and 136 made from the polysiloxane(amide-ureide) sealant material of the present invention are shown in place covering the faying surfaces occurring at the blanket/upper and lower skin interfaces 138 and 140 as well as the edges of the faying surfaces occurring at the interface of fasteners 142 and 144, and blanket 128.

Thus, the polysiloxane(amide-ureide)s of the present invention have anti-icing, and moisture penetration inhibition properties not previously found in known polyamides. Further, such compounds display degradation resistance, physical toughness and durability not previously found in known polyamides or polyureides. Thus, Component A, as previously defined, will take advantage of the icephobic properties of the polysiloxane (amide-ureide), thereby enabling the sealant materials to be able to resist separation of mated parts due to the hydrostatic forces encountered by freezing of water.

In other words, the reaction product from mixing Component A and Component B, i.e. the addition of

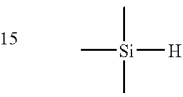

to an unsaturated C═C moiety, e.g. double-bonded or triple-bonded carbon, wherein one of the components, viz., Component A, has the polysiloxane (amide-ureide) as its major moiety, will impart excellent moisture penetration or adhesion/ice resistance to the subsequent coating derived therefrom.

A preferred halide-substituted dicarboxylic acid is a low molecular weight dicarboxylic acid wherein the hydrogen from each carboxylic acid component has been replaced with a halide constituent, typically chloride. At least a portion of the substituted dicarboxylic acids is preferably selected from fumaryl, succinyl, phthalyl, terephthalyl, and maleiyl halides, and more preferably fumaryl chlorides and maleiyl chlorides.

To prepare the preferred polymer of the present invention, two moles of the amine-terminated polysiloxane (II) is first reacted with one mole of a dicarboxylic halide to form an amine-terminated polyamide intermediate (V). After formation of the polyamide, two moles of the polyamide are reacted with one mole of a non-linear diisocyanate (VII) to form the polysiloxane (amide-ureide) of said halides, and use of the non-linear diisocyante result in a polysiloxane (amide-ureide) with a decidedly non-linear orientation. Thus, the resulting polymer (IV) contains functional amide groups, functional urea groups, and is amorphous rather than crystalline in nature, due to the non-linear orientation of the polymer molecules. Each of the amide functionality, the urea functionality and the non-linearity of the polymer improve the polymer's strength and anti-icing properties. Furthermore, the amide/urea moieties create crystallinity within the polymer via intermolecular hydrogen bonding which, in conjunction with the amorphous nature of the polysiloxane and the non-linearity of the diacid or diisocyanate, create a toughened polymer with enhanced physical properties.

The polysiloxane(amide-ureide)s of the present invention are particularly useful for application to aluminum or titanium surfaces and provides a coating which may be used to prevent ice formation upon the flight surfaces of an aircraft. The usefulness of the polysiloxane(amide-ureide) is not limited to metal surfaces, however. The polysiloxane(amide-ureide) finds use as a sealant material on any of a wide variety of non-metal substrates, carbon composites, and even wood or asphalt, a number of which may be applications unrelated to aircraft.

It is contemplated that the polysiloxane-containing sealant materials used in connection with the present invention as fillet seals, gap, pack void seals, etc. may directly contact the substrate surface, or may be applied as a second coating over a first coating, such as a corrosion-inhibiting coating. These preferred corrosion-inhibiting coatings are those capable of minimizing the passage of moisture, acids, or bases from the environmental surroundings under operational conditions to the aluminum substrate. Thus, such coatings are either hydrophobic materials and/or sacrificial substances, e.g, $SrCrO_4$ or other chromates, etc. Such useful coatings include hydrophobic coatings such as, polyethylene, polyethylene/tetrafluoroethylene copolymers, phenolics, epoxies, polyimides, polyurethanes, polyvinylchlorides, silicones and novolaks, with or without chromate fillers. In addition, the polysiloxane (amide-ureide) sealant materials of the present invention may themselves be used with an over-coat. That is, the fillet seals, pack void seals, etc. of the present invention may themselves be coated with an additional coating.

A number of curable, organic coating materials are available and may be used in conjunction with the present process to pre-coat or coat the substrate material. One coating material of this type comprises resin mixed with one or more plasticizers, other organic components such as polytetrafluoroethylene, and inorganic additives such as aluminum powder and/or chromates, such as strontium chromate, barium chromate, zinc chromate, and the like. See, for example, U.S. Pat. Nos. 6,475,610; 5,614,037; 6,274,200; 6,494,972; 5,944,918; and 5,858,133.

Novolaks are phenol/formaldehyde polymers that are formed by reacting phenol with less than an equivalent amount of formaldehyde (i.e., approximately 1:0.8 mole ratio) in an acid catalyzed reaction. This results in a more flexible polymer than the standard phenol formaldehyde which allows for ease of handling and application prior to it being further crosslinked at a later stage. Thus, novolaks can be applied to a substrate and later crosslinked by the addition of, for example, hexamethylene tetramine.

The preferred embodiments of the present invention relate to the preparation and application of sealant materials on aircraft structural components, preferably metals, more preferably aluminum-alloy components, and the following discussion will emphasize such articles. The use of the invention is not limited to components such as aircraft wing and fuselage skin panels, hinges, doors, etc., and instead is more broadly applicable. However, its use in aircraft structural components offers particular advantages. The procedures and compounds of the present invention in no way inhibit the optimum performance of the alloy components. To the contrary, the present methods allow the components to maintain their optimum mechanical and metallurgical properties while providing equivalent and/or improved levels of corrosion protection and pressurizations without the disadvantages associated with the wet-sealant approach. Indeed the present invention is contemplated as being useful with metallic materials, e.g., aluminum alloys, titanium alloys, ferrous alloys, etc. and non-metallic materials, e.g., composites, ceramic-, epoxy-, glass-, wood-, carbon-containing materials, etc.

As used herein, "aluminum-alloy" or "aluminum-base" means that the alloy has more than 50 percent by weight aluminum but less than 100 percent by weight of aluminum. Typically, the aluminum-base alloy has from about 85 to about 98 percent by weight of aluminum, with the balance being alloying elements, and a minor amount of impurity. Alloying elements are added in precisely controlled amounts to predictably modify the properties of the aluminum alloy. Alloying elements that are added to aluminum in combination to modify its properties include, for example, magnesium, copper, and zinc, as well as other elements. Additional corrosion- and heat-resistant alloys contemplated for use with the coatings of the present invention include Monel 400, Monel K-500, A-286 and Inconel 600, and stainless steels such as 302, 303, 304, 305, 410, 416, 430, Custom 450, and 17-4PH, titanium and titanium alloys, such as Ti 6AL-4V.

For aircraft structural components having faying surfaces such as wing and fuselage skin panels, stiffeners, frames, doors, hinges, etc., it is preferred that such components would have their faying surfaces "pre-coated" following the completion of their normal fabrication cycle but prior to final assembly, although coating of large sections of aluminum also could be coated during or after final assembly. The component such as a wing skin panel or wing skin panel stiffener such as a stringer is first fabricated to a desired shape. The alloying elements are selected such that the fabricated shape may be processed to have a relatively soft state, preferably by heating it to an elevated temperature for a period of time and thereafter quenching it to a lower temperature.

It is understood that preferred aluminum alloys may be subjected to thermal treatment and aging processes, including solution heat treatment or annealing, to obtain the necessary structural characteristics to achieve the desired performance specifications. In addition the treated and untreated aluminum alloys may be subjected to surface treatments such as Cd or ZnNi plating or flash treatment, anodizing, with or without surface seals (e.g. chromate seals), chemically-etched, grit-blasted or otherwise processed to modify its surface, such as would be known to one skilled in the metallurgy field.

The 7150 alloy is a specific, artificially-aged, aluminum-base alloy of particular interest for aircraft structural applications. The 7150 alloy has a composition of about 2.2 percent by weight copper, about 2.3 percent by weight magnesium, 6.4 percent by weight zinc, about 0.12 percent by weight zirconium and balance of aluminum plus minor impurities. Other suitable alloys include, but are not limited to, 2000, 4000, 6000, and 7000 series heat-treatable aluminum alloys. The 7150 alloy is available commercially from several aluminum companies, including ALCOA, Reynolds, Pechiney, and Kaiser.

As set forth in copending and commonly assigned U.S. Pat. No. 6,475,610, the first coating material described above is preferably provided in about 100% low-viscosity solid solution or "neat" material so that it may be readily and evenly applied. The usual function of the coating material is to protect the base metal to which it is applied from corrosion, including, for example, conventional electrolytic corrosion, galvanic corrosion, and stress corrosion. The preferred first coating material is a formulation primarily comprising an organic composition, but also may contain additives to improve the properties of the final coating. The coating may also be desirably dissolved initially in a carrier liquid and encapsulated. After application, the coating material is subjected to an environmental change of temperature and/or pressure to rupture the encapsulation. The coating is thus released to the component's substrate surface where it is subsequently cured to effect structural changes within the organic coating, typically cross-linking organic molecules to improve the adhesion and cohesion of the coating. As a result, the polysiloxane(amide-ureides) of the present invention, as well as the disclosed methods of their application provide significant advantages such as reduced toxicity, and reduced concern for compatibility of subsequently applied paints, coatings, manufacturing cycle time, etc.

The following examples serve only to further illustrate aspects of the present invention and should not be construed as limiting the invention.

EXAMPLE 1

The reaction between a high molecular weight diamine-terminated polysiloxane, dissolved in methylene chloride, with a tertiary amine, e.g., triethylamine, as an acid acceptor, and fumaryl chloride in a molar ratio of 2:1 resulted in the formation of a diamine-terminated poly(siloxane diamide).

The tertiary amine hydrochloride was filtered off and the resultant diamide was reacted with toluene-2,4-diisocyanate in a 1:1 molar ratio of diamide to diisocyanate to form a polysiloxane(amide-ureide) with repeated trans structure about the double bond of the fumaryl moiety. The ratio of amine-terminated poly(siloxane amide) to isocyanate was dictated by the functionality of the isocyanate, i.e., a tri-isocyanate would require two moles of the poly(siloxane amide) to one mole of tri-isocyanate.

EXAMPLE 2

Into a two liter, three-necked round bottom flask was added one mole of fumaryl chloride dissolved in 500 mils of methylene chloride. A dry, inert atmosphere was maintained by means of a drying tube and nitrogen purge. To this solution was added, slowly and with stirring, two moles of α,ω-diaminopolysiloxane, MW 26,000, dissolved in 500 mils of methylene chloride and containing two moles of triethylamine as an acid acceptor. After the addition was completed, the mixture was heated to 50° C. for one hour and the amine hydrochloride was filtered off, leaving the amine-terminated fumaryl polyamide in solution. The one mole of polyamide was added to one mole of 2,4-toluene diisocyanate dissolved in 100 mils of methylene chloride with a precaution of maintaining a dry, inert atmosphere. After allowing the reaction to proceed for 24 hours at room temperature, the methylene chloride solution of the polysiloxane(amide-ureide) was ready to be used as a coating material on the substrate needing ice protection. This is Sample C used in the ice testing shown in Table 1 below.

EXAMPLE 3

One mole of succinyl chloride, one mole of fumaryl chloride, and four moles of amine-terminated polydimethylsiloxane were reacted to yield polyamides with a trans amide component around the double bond of the fumaryl moiety and a linear amide component around the single bond of the succinyl moiety. Thus, the linearity of the polyamide may be adjusted prior to reaction with the diisocyanate by controlling the relative amounts of saturated and unsaturated acid halide, i.e. the relative amounts of fumaryl chloride versus succinyl chloride.

EXAMPLE 4

Two moles of fumaryl chloride and one mole of propylamine-terminated polydimethylsiloxane were reacted. The product was reacted with two moles of butylamine-terminated polydimethylsiloxane. That product was then reacted with one mole of toluene-2,4-diisocyanate to result in a block copolymer polysiloxane(amide-ureide).

EXAMPLE 5

Two moles of α,ω-diaminopolydimethylsiloxane (MW 26,000) was reacted with one mole of fumaryl chloride under conditions as described in Example 2 to form a first product. One mole of toluene-2,4-diisocyanate was reacted with two moles of α,ω-diaminopolydimethylsiloxane (MW 2,300) under conditions as described in Example 2 to form a second product. These products (each amine-terminated) were then reacted with two moles of fumaryl chloride to result in a block copolymer(amide-ureide). This is Sample D used in ice testing shown in Table 1. See below.

EXAMPLE 6

To prepare Component A, two moles of α,ω-diamino-polysiloxane were dissolved in one liter of methylene chloride, containing two moles of a tertiary amine, such as triethylamine as an acid acceptor, and one mole of an acid dihalide, such as fumaryl chloride, added under inert atmosphere to the diaminopolysiloxane. After the addition was completed, the mixture was heated to 50° C. for one hour and the amine hydrochloride filtered off, leaving the amine-terminated fumaryl polyamide in solution. Two moles of the amine-terminated polysiloxane/amide was then added to one mole of a diisocyanate, such as 2,4-toluene diisocyanate, under inert atmosphere conditions. After allowing the reaction to proceed for 24 hours at room temperature, the resultant amine-terminated polysiloxane (amide/ureide) was now ready for reaction with an unsaturated acid halide, such as acryloyl chloride or methacryloyl chloride or vinyl benzoyl chloride.

Two moles of the unsaturated acid chloride was added to one mole of the amine-terminated polysiloxane (amide/ureide) in the presence of a tertiary amine as an acid-acceptor. After the addition of the acid chloride to the amine-terminated polysiloxane (amide/ureide) was completed, the amine hydrochloride was filtered off and the resultant vinyl-terminated amide polysiloxane (amide/ureide) was now Component A and ready to be used either in solution or as a neat material after removing the solvent under vacuum.

EXAMPLE 7

The combination of Component A and Component B may be applied in neat form to a fay surface or any other surface, by having Component A and Component B in two separate reservoirs of a spray gun with the catalyst dissolved in Component A. The catalyst is a platinum divinyltetramethyldisiloxane complex (obtained from United Chemical Technologies, Inc. Bristol, Pa.). Component B, a polysiloxane-hydride terminated or polyhydrosiloxane (with hydrogen attached to silicon along the polymer chain, may be obtained from United Chemical Technologies, Inc. or Dow Chemical Co., Midland, Mich.).

By heating the solutions to 60° C. and pressurizing the solutions to about 2500 psi (with a pre-adjusted stoichiometric ratio in each reservoir) and forcing them to mix at the nozzle of a spray gun such as a Gusmer VH-3000 gun, at the elevated temperature, the reaction between Component A and Component B begins immediately upon mixing and deposits on the substrate as a coherent film. For crosslinking purposes, the Component B may contain mixtures of (Ic) and (Ib) such that (Ic) is in slight excess, but still maintaining an equivalent stoichiometry of (Ia) (Component A) to the total amount of hydride moieties (Component B). Alternative to the neat reaction, the solutions of Component A and Component B may be dissolved in a solvent such as a toluene/methylene chloride mixture (1:1 ratio) and the subsequent solutions mixed at the nozzle of the spray gun (as was done in the neat reaction). Upon deposition on the substrate, the solvent will flash off and leave a coherent film on the faying surface.

EXAMPLE 8

Ice adhesion tests were performed by freezing ice between two surfaces of a temperature controlled Instron tester and then forcing the surfaces apart until the ice reached cohesive or adhesive failure. According to this testing method, an upper aluminum plate and lower aluminum plate are positioned directly opposite and facing one another. The lower plate is coated with a sealing layer. Water is then positioned between the upper plate and the coating layer where it is allowed to freeze into a solid ice layer in a temperature controlled chamber chilled to 20° F. The aluminum plates were pulled apart at a rate of 0.02 in/min from one another under carefully measured conditions until the ice separates from one of the surfaces, or suffers adhesive failure. The tension at separation is noted. The type of ice failure (adhesive vs. cohesive) is also noted. For this example, four different substances were tested in the temperature-controlled Instron™ test machine. The results are shown in Table 1 below. The samples were as follows:

TABLE 1

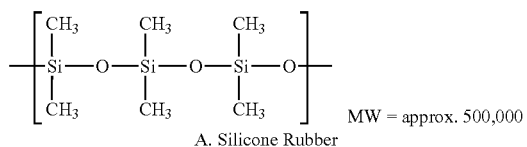
A. Silicone Rubber  MW = approx. 500,000

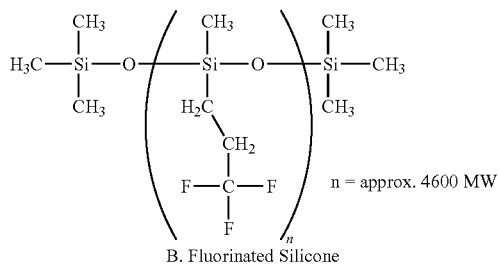
B. Fluorinated Silicone  n = approx. 4600 MW

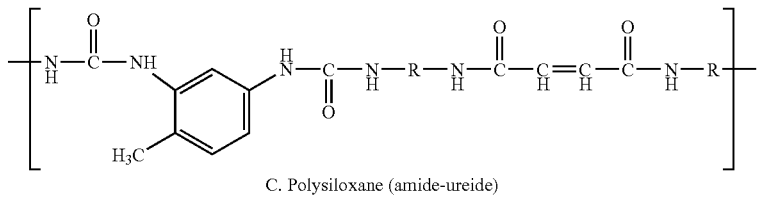
C. Polysiloxane (amide-ureide)

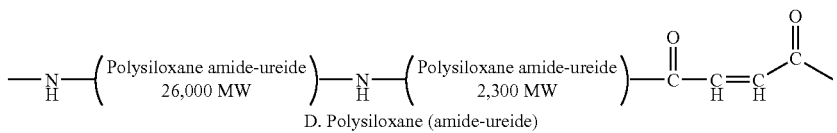
D. Polysiloxane (amide-ureide)

| Surface | Ice Thickness (in.) | Breakforce (lb./in²) | Number of Runs | Standard Deviation | Adhesive/Cohesive Failure (%) |
|---|---|---|---|---|---|
| A | 0.03 | 7 | 3 | 3.4 | 100/0 |
|   | 0.01 | 5 | 3 | 0.6 | 100/0 |
| B | 0.03 | 91 | 5 | 52.8 | 10/90 |
|   | 0.01 | 9 | 3 | 10.1 | 97/3 |
| C | 0.03 | 5 | 3 | 0.58 | 100/0 |
|   | 0.01 | 10 | 4 | 2.6 | 100/0 |
| D | 0.03 | 0 | 3 | 0 | 100/0 |
|   | 0.01 | 2 | 3 | 2.6 | 100/0 |

As shown, the polysiloxane(amide-ureide) Samples C and D had very favorable ice release characteristics, releasing at 5 lb/in² and 0 lb/in² respectively for ice thicknesses of 0.03 inches, and 10 lb/in² and 2 lb/in² respectively for ice thickness of 0.01 inches. Note that the silicone rubber coating A had very favorable ice shedding characteristics, but silicone rubber does not form a tough coating and is unsuitable for application to aircraft surfaces, etc. The polysiloxane(amide-ureide)s of the present invention show significantly better ice shedding characteristics compared with the fluorinated siloxane samples, which are typically considered to be highly icephobic.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A sealant material comprising a polymer formed from repeating units having the formula:

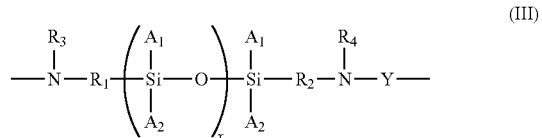

(III)

wherein
for each repeating unit of the polymer, $R_1$ and $R_2$ are independently selected from the group consisting of $C_1$ to $C_{10}$ alkyls, aryls, and polyaryls;
for each repeating unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
for each repeating unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;

for each repeating unit of the polymer, x is a number from 1 to about 10,000; and for each repeating unit of the polymer, Y is selected from a dicarboxyl residue and a diisocyanate residue such that about 40 mol % to about 60 mol % of the Y component within the polymer is a diisocyanate residue, wherein at least one of the diisocyanate residues is non-linear.

2. The sealant material of claim 1 wherein the dicarboxyl residue is selected from fumaryl moieties, maleiyl moieties, saturated $C_1$ to $C_{10}$ dicarboxyl moieties, and partially-saturated $C_3$ to $C_{10}$ dicarboxyl moieties.

3. The sealant material of claim 1, wherein at least one of $R_1$ and $R_2$ are selected from the group consisting of halogenated alkyls and halogenated aryls.

4. The sealant material of claim 1 wherein x is a number from about 200 to about 500.

5. A method of imparting moisture penetration-inhibiting properties to a substrate seal, comprising
supplying a substrate having a surface, and
applying a sealant material according to claim 1 to at least a portion of the surface.

6. The method according to claim 5, wherein the seal is selected from the group consisting of a fillet seal and a void pack seal.

7. The method of claim 5, wherein the polymer is applied to the surface as a solution of the polymer in methylene chloride/toluene mixture (1:1 ratio) onto the surface.

8. The method of claim 5, wherein the polymer coating is applied to the surface by
dissolving an amine-terminated polyamide intermediate of formula (V) in a methylene chloride/toluene mixture;

isocyanate groups are bound to the X moiety so as to be positioned in a non-linear relationship with respect to one another;
combining the dissolved amine-terminated polyamide intermediate and dissolved diisocyanate just prior to or concurrent with application of the combination to the surface.

9. The method of claim 5, wherein at least one of the solutions contains solids prior to application to the surface of the substrate.

10. The method of claim 5, wherein the substrate is selected from the group consisting of metals, carbon composites, wood, asphalt, resin matrices containing graphite, carbon, or glass fibers, or combinations thereof.

11. The method of claim 5, wherein the metals are selected from the group consisting of aluminum alloys, titanium alloys and ferrous alloys.

12. A vehicle comprising the sealant material of claim 5.

13. An aircraft comprising the sealant material of claim 5.

14. A corrosion-resistant and moisture-resistant sealant material comprising a polymer formed from repeat units having the formula:

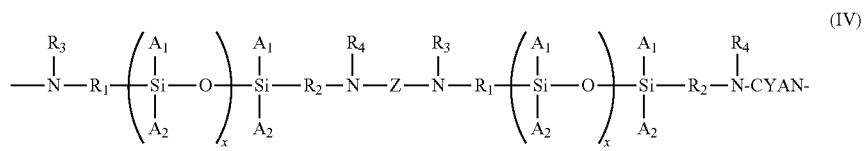

(IV)

wherein
for each repeat unit of the polymer, $R_1$ and $R_2$ are independently selected from the group consisting of $C_1$ to $C_{10}$ alkyls, aryls, and polyaryls;
for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
for each repeat unit of the polymer, $A_1$ and $A_2$ are independently selected from the group consisting of hydrogen,

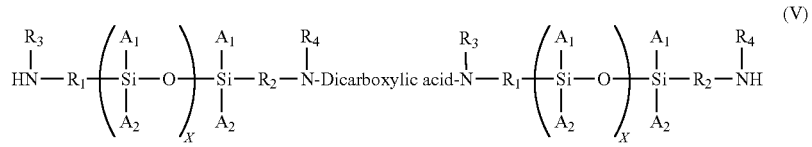

(V)

wherein
$R_1$ and $R_2$ are independently selected from the group consisting of $C_1$ to $C_{10}$ alkyls, aryls, and polyaryls;
$R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
$A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; and,
x is a number from 1 to about 10,000; and
dissolving an amount of isocyanate of formula (VII) in methylene chloride/toluene mixture;

(VII)

wherein n≧2; and wherein X is selected from the group consisting of aliphatic and aromatic moieties and the $C_1$ to $C_6$ alkyls, aryls, polyaryls, $C_3$ to $C_6$ cycloaliphatics, and $C_3$ to $C_6$ heterocycles;
for each repeat unit of the polymer, x is a number from 1 to about 10,000; and
for each repeat unit of the polymer, Z is a dicarboxyl residue; and
for each repeat unit of the polymer, CYAN is a non-linear diisocyanate residue.

15. The sealant material of claim 14 wherein Z is selected from the group consisting of fumaryl moieties, maleiyl moieties, saturated $C_1$ to $C_{10}$ dicarboxyl moieties, and partially-saturated $C_3$ to $C_{10}$ dicarboxyl moieties.

16. The sealant material of claim 14, wherein at least one of $R_1$ and $R_2$ are selected from the group consisting of halogenated alkyls and halogenated aryls.

17. The sealant material of claim 14 wherein x is a number from about 200 to about 500.

18. A substrate resistant to corrosion, ice formation and moisture penetration, comprising
a substrate having a seal on a substrate surface made from a polymer,
wherein the polymer is formed from repeat units having the formula:

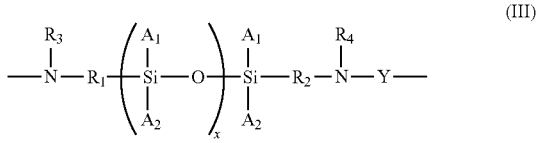

(III)

wherein
for each repeat unit of the polymer, $R_1$ and $R_2$ are independently selected from the group consisting of $C_1$ to $C_{10}$ alkyls, aryls, and polyaryls;
for each repeat unit of the polymer, $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;
for each repeat unit of the polymer, $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;
for each repeat unit of the polymer, x is a number from 1 to about 10,000; and
for each repeat unit of the polymer, Y is selected from a dicarboxyl residue and a diisocyanate residue such that about 40 mol % to about 60 mol % of the Y component within the polymer is a diisocyanate residue, wherein at least one of the diisocyanate residues is non-linear.

19. The substrate of claim 18, wherein at least one of $R_1$ and $R_2$ are selected from the group consisting of halogenated alkyls and halogenated aryls.

20. The substrate of claim 18, wherein x is a number from about 200 to about 500.

21. The substrate of claim 18, wherein the substrate is selected from the group consisting of as metal, carbon composites, wood, asphalt, resin matrices containing graphite, carbon, or glass fibers, or combinations thereof.

22. The substrate of claim 18, wherein the metal is selected from the group consisting of aluminum alloy, titanium alloy and ferrous alloy.

23. A vehicle comprising the substrate of claim 18.

24. An aircraft comprising the substrate of claim 18.

25. The substrate of claim 18, wherein the seal is selected from the group consisting of fillet seals and pack void seals.

26. The substrate of claim 18, wherein the polymer comprises a polymer formed from repeat units having the formula:

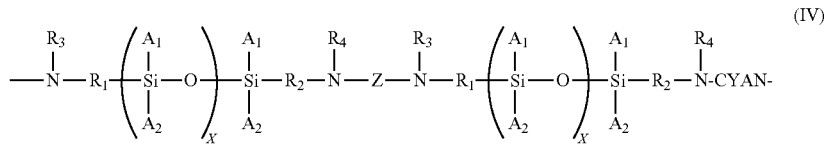

(IV)

wherein
for each repeat unit of the polymer, Z is a dicarboxyl residue; and
for each repeat unit of the polymer, CYAN is a non-linear diisocyanate residue.

* * * * *